United States Patent
Wang et al.

(10) Patent No.: US 9,426,765 B2
(45) Date of Patent: Aug. 23, 2016

(54) METHOD OF HANDLING UPLINK SYNCHRONIZATION AND RELATED COMMUNICATION DEVICE

(75) Inventors: Chun-Yen Wang, Taipei Hsien (TW); Chun-Chia Chen, Taipei Hsien (TW); Shiang-Jiun Lin, Taipei Hsien (TW)

(73) Assignee: ACER INCORPORATED, New Taipei (TW)

( * ) Notice: Subject to any disclaimer, the term of this patent is extended or adjusted under 35 U.S.C. 154(b) by 658 days.

(21) Appl. No.: 12/987,163

(22) Filed: Jan. 10, 2011

(65) Prior Publication Data

US 2011/0170535 A1    Jul. 14, 2011

Related U.S. Application Data

(60) Provisional application No. 61/293,871, filed on Jan. 11, 2010.

(51) Int. Cl.
| | |
|---|---|
| *H04J 3/06* | (2006.01) |
| *H04J 3/00* | (2006.01) |
| *H04J 1/00* | (2006.01) |
| *H04W 4/00* | (2009.01) |
| *H04W 56/00* | (2009.01) |

(52) U.S. Cl.
CPC .................. *H04W 56/0045* (2013.01)

(58) Field of Classification Search
CPC .................................................. H04W 56/00
USPC ............... 370/350, 336, 329, 330; 455/436
See application file for complete search history.

(56) References Cited

U.S. PATENT DOCUMENTS

| | | | |
|---|---|---|---|
| 2006/0072520 A1* | 4/2006 | Chitrapu et al. | 370/337 |
| 2008/0232317 A1* | 9/2008 | Jen | 370/329 |
| 2009/0046641 A1* | 2/2009 | Wang et al. | 370/329 |
| 2009/0111445 A1 | 4/2009 | Ratasuk | |
| 2009/0279495 A1* | 11/2009 | Yoo | 370/329 |
| 2010/0232373 A1* | 9/2010 | Nory et al. | 370/329 |
| 2010/0238908 A1* | 9/2010 | Wu | 370/336 |
| 2010/0240372 A1* | 9/2010 | Wu | 455/436 |
| 2010/0254356 A1* | 10/2010 | Tynderfeldt et al. | 370/336 |

(Continued)

FOREIGN PATENT DOCUMENTS

| | | |
|---|---|---|
| EP | 2 099 248 A2 | 9/2009 |
| EP | 2 117 156 A2 | 11/2009 |

(Continued)

OTHER PUBLICATIONS

Huawei, "Different Timing Advance Impact on Carrier Aggregation", 3GPP TSG RAN WG2 Meeting #67bis, R2-095815, Miyazaki, Japan, Oct. 12-Oct. 16, 2009.

(Continued)

*Primary Examiner* — Kiet Tang
(74) *Attorney, Agent, or Firm* — Winston Hsu; Scott Margo

(57) ABSTRACT

A method of handling uplink synchronization for a mobile device capable of receiving and transmitting on a plurality of component carriers in a wireless communication system is disclosed. The method comprises performing a first random access procedure on a first component carrier of the plurality of component carriers to establish uplink synchronization on the first component carrier, and performing a second random access procedure on at least a component carrier of the plurality of component carriers to establish uplink synchronization on the at least a component carrier.

12 Claims, 25 Drawing Sheets

(56) References Cited

U.S. PATENT DOCUMENTS

2010/0260136 A1* 10/2010 Fan et al. .................. 370/330
2010/0322175 A1* 12/2010 Chen ......................... 370/329
2012/0182986 A1*  7/2012 Sebire ........................ 370/343
2013/0010619 A1*  1/2013 Fong et al. ................. 370/252

FOREIGN PATENT DOCUMENTS

| EP | 2 230 870 A1 | 9/2010 |
| EP | 2 487 970 A1 | 8/2012 |
| WO | 2009088204 A3 | 7/2006 |
| WO | 2009/061256 A1 | 5/2009 |
| WO | 2009088204 A2 | 7/2009 |
| WO | 2010151213 A1 | 12/2010 |
| WO | 2011085200 A1 | 7/2011 |

OTHER PUBLICATIONS

Nokia Corporation, Nokia Siemens Networks, RACH and carrier aggregation, 3GPP TSG-RAN WG2 Meeting #67bis, R2-095898, Oct. 12-16, 2009, XP050390352, Miyazaki, Japan.

CATT, Consideration on RACH procedure and RLF, 3GPP TSG RAN WG2 Meeting #68, R2-096506, Nov. 9-13, 2009, pp. 1-2, XP050391093, Jeju, Korea.

Nokia Siemens Networks, Nokia Corporation, Carrier Aggregation and Timing Advance, 3GPP TSG-RAN WG2 Meeting #67bis, R2-095519, Oct. 12-16, 2009, XP050390061, Miyazaki, Japan.

3GPP TSG-RAN2 Meeting #65 R2-090976, Panasonic etc., Processing of contention resolution message., Feb. 9-13, 2009.

* cited by examiner

METHOD OF HANDLING UPLINK SYNCHRONIZATION AND RELATED COMMUNICATION DEVICE

CROSS REFERENCE TO RELATED APPLICATIONS

This application claims the benefit of U.S. Provisional Application No. 61/293,871, filed on Jan. 11, 2010 and entitled "Methods and System for Multiple Uplink Timing Synchronization" the contents of which are incorporated herein in their entirety.

BACKGROUND OF THE INVENTION

1. Field of the Invention

The application relates to a method utilized in a wireless communication system and a communication device thereof, and more particularly, to a method of handling uplink synchronization in a wireless communication system and a related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, an UE needs to be synchronized with an eNB (e.g. a base station) on uplink timing, so that the eNB can schedule an uplink transmission for it. For uplink synchronization, the UE has to maintain a time alignment timer whose running state indicates that the UE is synchronized with the base station on uplink timing. On the other hand, the UE no longer has uplink synchronization with the eNB when the time alignment timer is not in the running state (e.g. the time alignment timer has expired). Under situations that the time alignment timer is not running or has expired, prior to any uplink transmission, the UE performs a random access procedure to derive a timing advance value which the UE uses to adjust its timings of uplink transmissions to the base station to compensate for propagation delay, so as to prevent signals transmitted from the UE from colliding with those sent from other UEs under the coverage of the eNB.

Besides, the UE updates the timing advance value for maintenance of uplink time alignment according to a timing alignment command (TAC) received from the base station. In general, if the UE is synchronized with the base station on uplink timing, the timing alignment command is carried in a medium access control (MAC) control element for transmission. Otherwise, the timing alignment command is transmitted through a random access response message of the random access procedure. In addition, whenever the timing advance value is updated, the UE shall start or restart the time alignment timer.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In addition, COMP is considered for LTE-Advanced as a tool to improve coverage of high data rates, cell edge throughput, and system efficiency, which implies dynamic coordination among multiple geographical separated points. That is, when an UE is in a cell-edge region, the UE is able to receive signal from multiple cells, and the multiple cells can receive transmission of the UE.

As can be seen from the above, the UE of the LTE system supports features of receiving and transmitting on one single component carrier, and thereby performs uplink synchronization only on one component carrier. That is, the UE performs a single random access procedure to achieve uplink time alignment, maintains a single time alignment timer, and updates the timing advance value only for one component carrier. However, the UE of the LTE-Advanced system supports features of simultaneously receiving and transmitting on multiple component carriers, which may have different timing advance values. The LTE-Advanced system does not clearly specify how the uplink synchronization is applied to the UE with multiple component carriers. In other words, how the UE maintains the time alignment timer, obtains timing advance values, and updates the timing advance values for multiple component carriers is never concerned. Uplink transmissions may fail since the UE does not know how to perform uplink synchronization on multiple component carriers.

SUMMARY OF THE INVENTION

The application discloses a method of handling uplink synchronization in a wireless communication system and a related communication device in order to solve the above-mentioned problems.

A method of handling uplink synchronization for a mobile device capable of receiving and transmitting on a plurality of component carriers in a wireless communication system is disclosed. The method comprises performing a first random access procedure on a first component carrier of the plurality of component carriers to establish uplink synchronization on the first component carrier, and performing a second random access procedure on at least a component carrier of the plurality of component carriers to establish uplink synchronization on the at least a component carrier.

A method of handling uplink synchronization for a mobile device capable of receiving and transmitting on a plurality of component carriers in a wireless communication system is disclosed. The method comprises managing a plurality of time alignment timers each for some of the plurality of component carriers with the same feature to indicate a synchronization state on the component carriers with the same feature, or managing a plurality of time alignment timers each for a component carrier of the plurality of component carriers to indicate a synchronization state on the component carrier.

A method of handling uplink synchronization for a mobile device capable of receiving and transmitting on a plurality of component carriers in a wireless communication system is disclosed. The method comprises managing a time alignment timer for the plurality of component carriers, and maintaining a plurality of indicators corresponding to the plurality of component carriers for indicating timing alignment timer validity for the plurality of component carriers, or maintaining a plurality of indicators each corresponding to some of the plurality of component carriers for indicating timing alignment timer validity for the component carriers with the same feature.

A method of handling uplink synchronization for a mobile device capable of receiving and transmitting on a plurality of component carriers in a wireless communication system is disclosed. The method comprises initiating a random access procedure or an uplink signal transmission on the plurality of component carriers, receiving a message including at least a timing advance command for updating at least a timing advance value of at least a component carrier of the plurality of component carriers from a network of the wireless communication system, and applying the at least a timing advance command to the at least a component carrier for timing advance value update.

A method of handling uplink synchronization for a mobile device capable of receiving and transmitting on a plurality of component carriers in a wireless communication system is disclosed. The method comprises performing a plurality of random access procedures on the plurality of component carriers to establish uplink synchronization on the plurality of component carriers.

A method of handling uplink synchronization for a network in a wireless communication system comprising a mobile device capable of receiving and transmitting on a plurality of component carriers is disclosed. The method comprises determining a plurality of timing advance values of the plurality of component carriers based on a random access procedure or an uplink signal transmission initiated by the mobile device on the plurality of component carriers, determining whether to update the plurality of timing advance values for the plurality of component carriers, aggregating at least a timing advance command in a message for timing advance update when determining to update at least a component carrier of the plurality of timing advance values, and sending the message to the mobile device through one of the plurality of component carriers.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
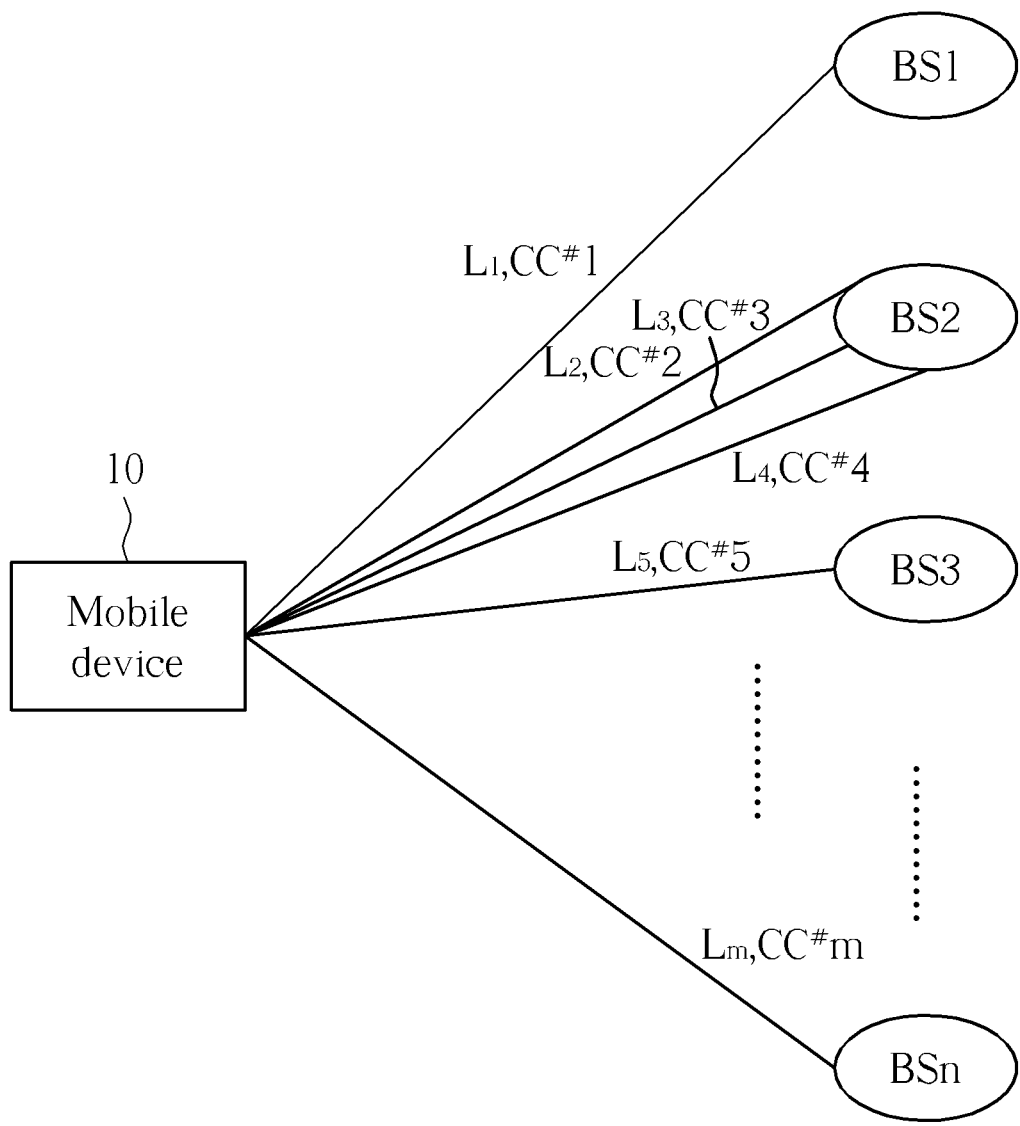
FIG. 1 illustrates a schematic diagram of an exemplary wireless communication system.

Please refer to FIG. 1, which illustrates a schematic diagram of a wireless communication system featuring multiple connections between a mobile device 10 and base stations BS1-BSn. The wireless communication system may be a LTE-Advanced system or any other similar network system. The mobile device 10 can operate with carrier aggregation and/or COMP. In FIG. 1, the mobile device 10 communicates with the base stations BS1-BSn through radio links $L_1$-$L_m$ that correspond to component carriers cc#1-cc#m configured in the mobile device 10 respectively. Note that, the component carriers cc#1-cc#m can belong to the same or different base stations (e.g. an eNB, a relay, a repeater, etc.). Each of the component carriers cc#1-cc#m corresponds to a radio frequency (RF) channel whose bandwidth may be varied according to different communication systems. In addition, the mobile device 10 is referred as an user equipment (UE) or a mobile station (MS), and can be a device such as a mobile phone, a computer system, etc.

Figure 2:
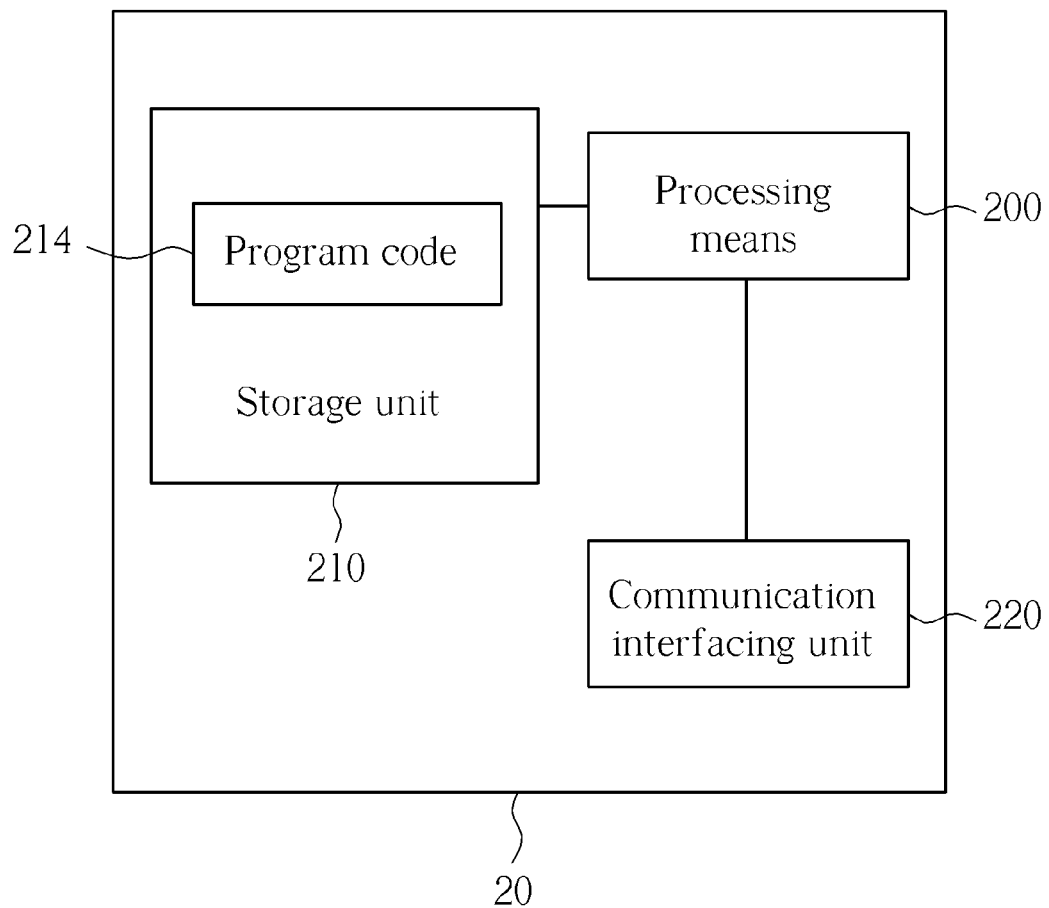
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
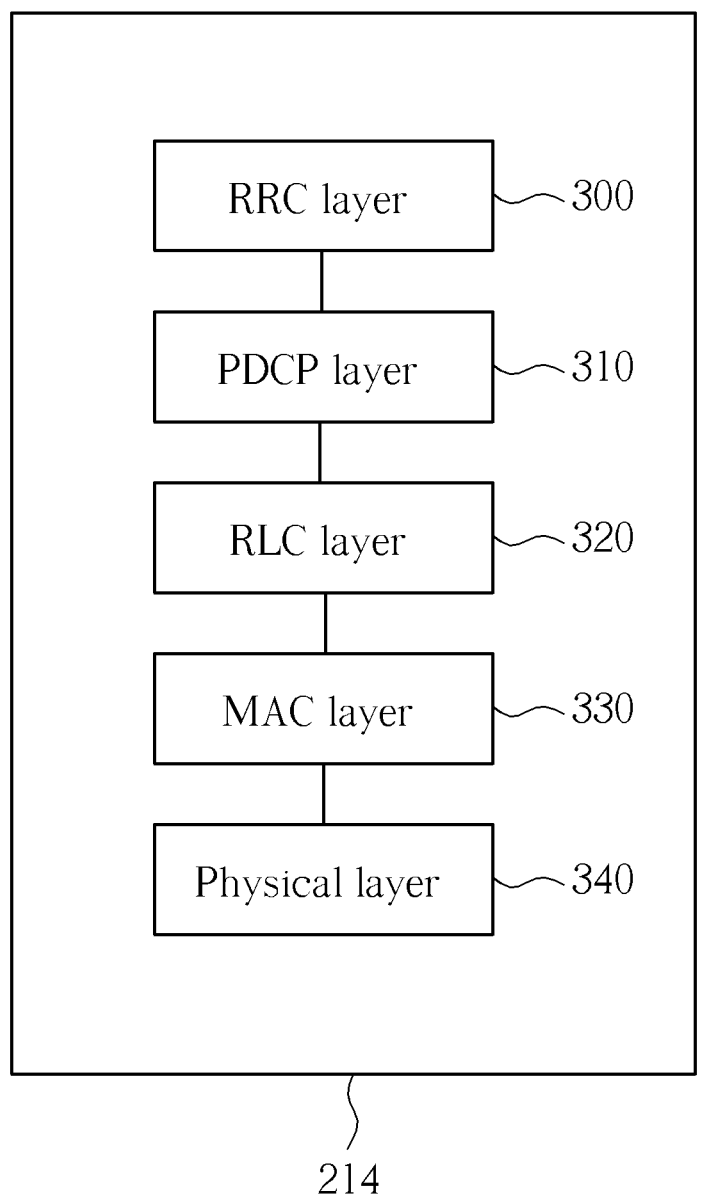
FIG. 3 illustrates a schematic diagram of communication protocol layers for an exemplary communication system.

Please refer to FIG. 3, which illustrates a schematic diagram of communication protocol layers for the LTE-Advanced system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. Main services and functions of the MAC layer 330 include error correction through HARQ, uplink synchronization through a random access procedure, etc.

In order to achieve uplink synchronization on multiple component carriers (e.g. cc#1-cc#m), three functions for the uplink synchronization shall be concerned: uplink time alignment, timing alignment timer maintenance, and timing advance update.

Figure 22:
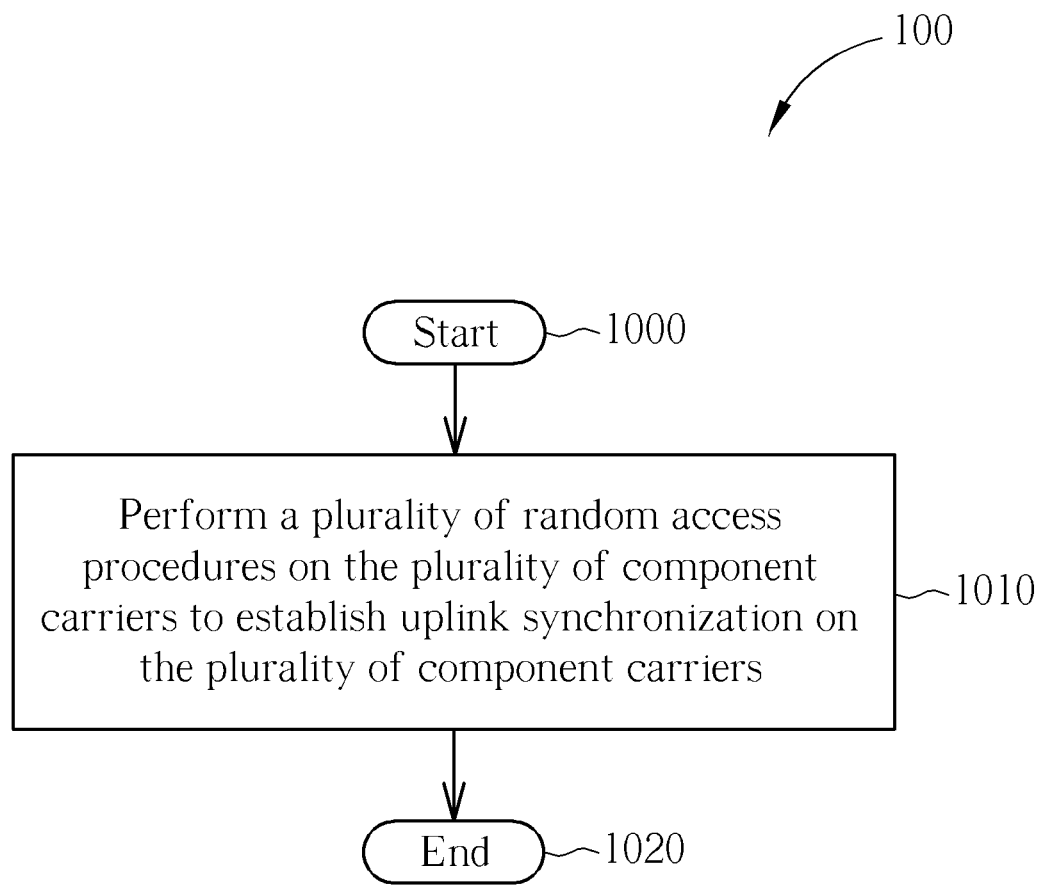
FIG. 22 is a flowchart of exemplary processes.

Please refer to FIG. 22, which illustrates a flowchart of an exemplary process 100. The process 100 is utilized in a UE, as the mobile device 10 of FIG. 1, capable of communicating with a network (i.e. a cell, an eNB, or a base station) through a plurality of component carriers for handling uplink synchronization. The process 100 can be compiled into the program code 214 and includes the following steps:

Step 1000: Start.

Step 1010: Perform a plurality of random access procedures on the plurality of component carriers to establish uplink synchronization on the plurality of component carriers.

Step 1020: End.

According to the process 100, the UE establishes uplink synchronization on the plurality of component carriers by performing the plurality of random access procedures on the plurality of component carriers in parallel, so as to achieve uplink synchronization on multiple component carriers.

For example, the UE simultaneously performs a number of "m" random access procedures for the component carrier cc#1-cc#m, and thereby achieving uplink synchronization on the component carrier cc#1-cc#m. Note that, the random access procedures may be contention-based random access procedures. Thus, when the UE receives random access responses of the contention-based random access procedures from the component carriers cc#1-cc#m, the UE obtains timing advance values of the component carrier cc#1-cc#m derived from the random access responses, for uplink timing alignment.

Continuously, some messages of the random access procedures may be aggregated into one message. For example, the network aggregates contention resolution messages of the contention-based random access procedures into an "aggregated contention resolution" message, and sends it through one of the component carriers cc#1-cc#m (i.e. the component carrier cc#2).

Figure 4:
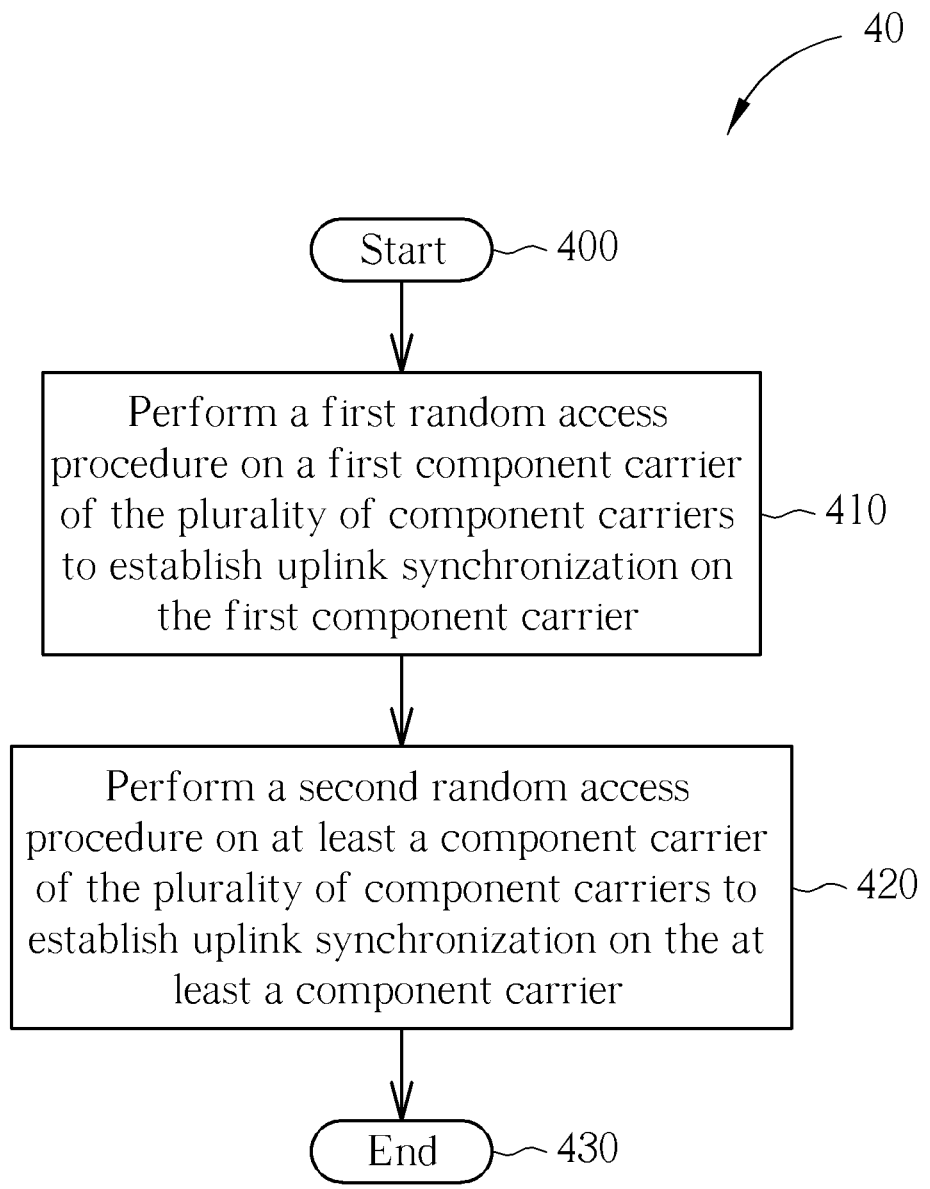
FIG. 4 is a flowchart of an exemplary process.

Please refer to FIG. 4, which illustrates a flowchart of an exemplary process 40. The process 40 is utilized in a UE, as the mobile device 10 of FIG. 1, capable of communicating with a network through a plurality of component carriers for handling uplink synchronization. The process 40 can be compiled into the program code 214 and includes the following steps:

Step 400: Start.

Step 410: Perform a first random access procedure on a first component carrier of the plurality of component carriers to establish uplink synchronization on the first component carrier.

Step 420: Perform a second random access procedure on at least a component carrier of the plurality of component carriers to establish uplink synchronization on the at least a component carrier.

Step 430: End.

According to the process 40, the UE establishes uplink synchronization on the first component carrier by performing the first random access procedure on the first component carrier, and establishes uplink synchronization on the at least a component carrier by performing the second RA procedure on the at least a component carrier, so as to achieve uplink synchronization on multiple component carriers.

For example, referring back to FIG. 1, the UE performs a first contention based random access procedure on component carrier cc#1, performs a second contention-based random access procedure on component carrier cc#2, and so on, and thereby achieving uplink synchronization on each of the component carrier cc#1-cc#m. In a word, the UE performs the plurality of random access procedures on the plurality of component carriers in series, to establish uplink synchronization on each of the plurality of component carriers.

Figure 5:
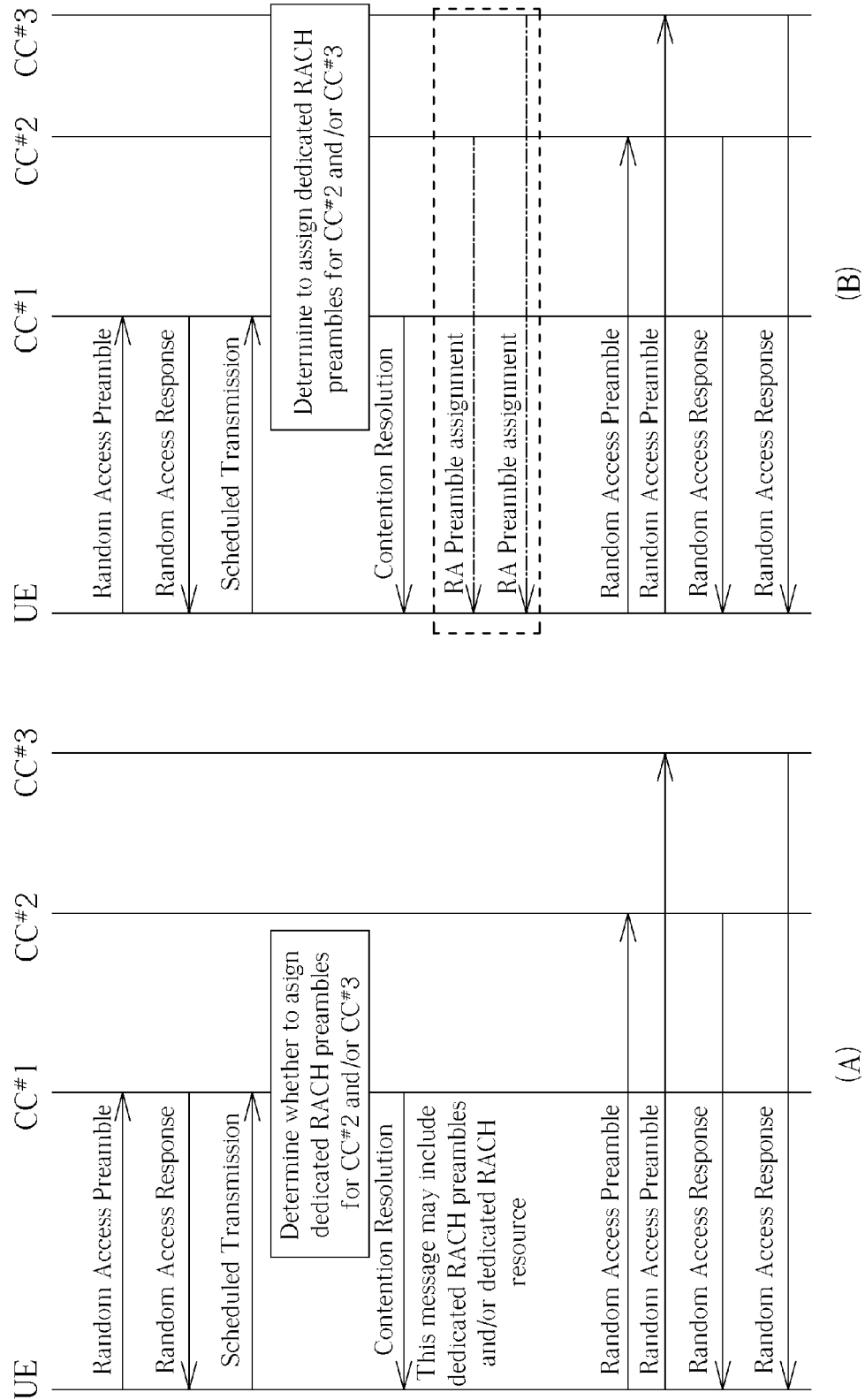
FIG. 5-9 are transmission sequence diagrams of a communication device with a plurality of component carriers according to different embodiments.

In addition, take some examples based on the process 40. Please refer to FIG. 5, which is a transmission sequence diagram of a UE with a plurality of component carriers according to a first embodiment. Briefly, only three component carriers cc#1, cc#2 and cc#3 are presented. In FIG. 5(A), the UE initiates a contention-based random access procedure on the component carrier cc#1 and thereby obtaining a first timing advance value in a first random access response of the contention-based random access procedure for uplink timing alignment. On the other hand, the network determines whether to assign dedicated random access preambles for component carrier cc#2 and/or cc#3. The network assigns the dedicated random access preambles for component carriers cc#2 and cc#3 to the UE by a contention resolution message of the contention-based random access procedure when determining to assign the dedicated random access preambles for both. After the contention resolution message including the dedicated random access preambles for the component carrier cc#2 and cc#3 is received, the UE initiates a non-contention based random access procedure on the component carriers cc#2 and cc#3. The UE transmits the random access preambles to the component carriers cc#2 and cc#3 respectively, so that the network can determine timing advance values of the component carriers cc#2 and cc#3 based on the corresponding random access preambles. After that, the UE receives random access responses including the timing advance values of the component carrier cc#2 and cc#3 for uplink timing alignment.

Please note that, besides the contention resolution message, as can be seen in FIG. 5(B), the network can utilize a random access preamble assignment message to assign a random access preamble to the UE, for non-contention based random access procedure initiation. On the other hand, the network may aggregate the random access preamble assignment messages from the component carriers cc#2-cc#3 into one random access preamble assignment message, which includes random access preambles for the component carriers cc#2-cc#3, and send it through one of the component carriers cc#1-cc#3, to reduce signalling amount.

Figure 6:
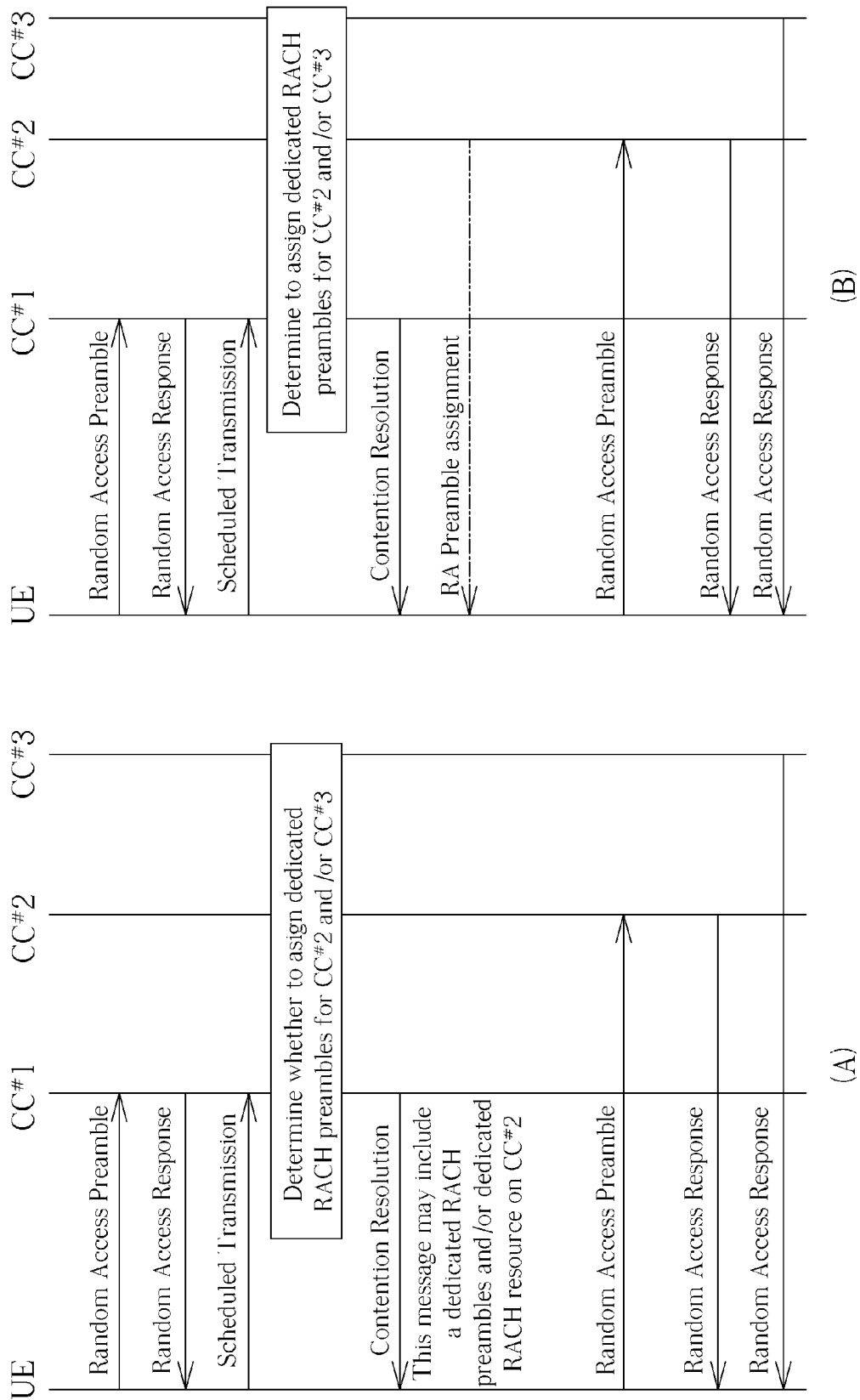

For the second example, please refer to FIG. 6. The UE performs the contention based random access procedure to obtain the timing advance value of the component carrier cc#1 for uplink timing alignment. Meanwhile, the network determines whether to assign dedicated random access preambles for the component carrier cc#2 and/or cc#3. Compared to the first example, the network assigns one dedicated random access preamble for the component carrier cc#2, and determines timing advance values for the component carriers cc#2 and cc#3 based on the same dedicated random access preamble. In other words, the UE receives a contention resolution message or a random access preamble assignment message including a dedicated random access preamble only for the component carrier cc#2, and thereby transmits the random access preamble only to the component carrier cc#2. Instead, the UE receives random access responses including the timing advance values of the component carriers cc#2 and cc#3 respectively from both of the component carriers cc#2 and cc#3.

Figure 7:
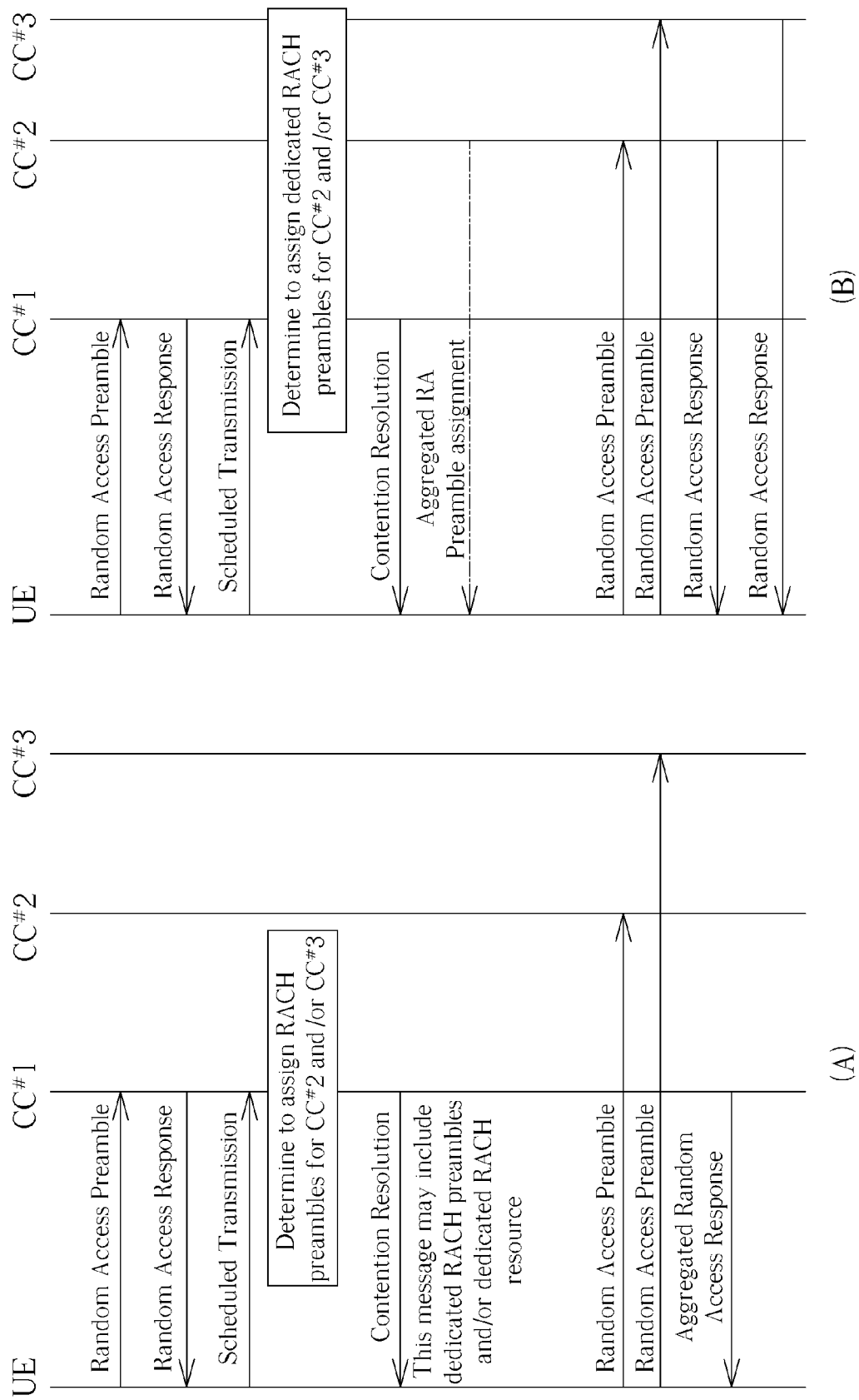

For the third example, please refer to FIG. 7. The network may aggregate random access responses into one message (e.g. an "Aggregated Random Access Response" message in FIG. 7(A)), and the "Aggregated Random Access Response" message may be transmitted on any of the component carriers cc#1-cc#3. In addition, the network may aggregate random access preambles into one message (e.g. an "Aggregated Random Access Preamble assignment" message in FIG. 7(B)). Therefore, a number of signaling can be decreased.

Figure 8:
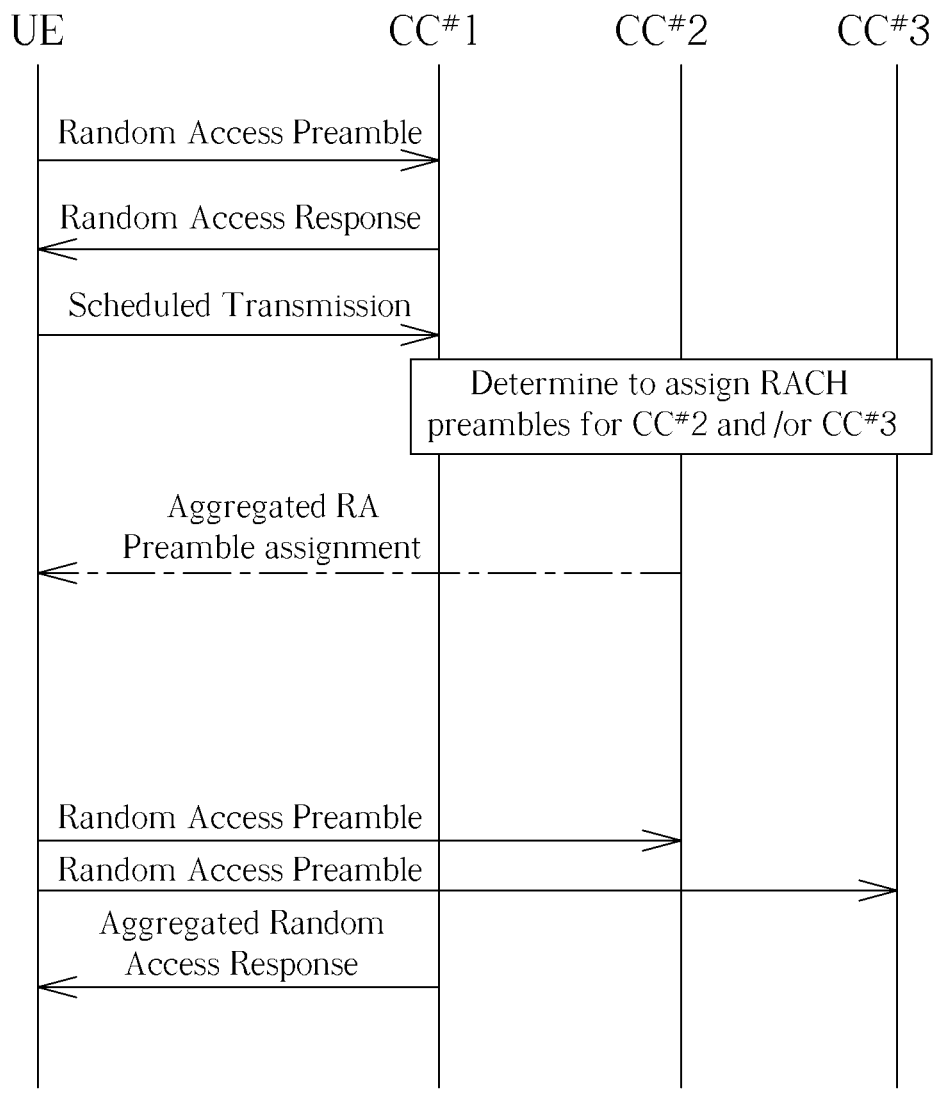

For the fourth example, please refer to FIG. 8. The network may omit a contention resolution message of the contention-based random access procedure. On the other hand, the UE determines the contention-based random access procedure is successfully performed when a dedicated random access preamble is received (e.g. from the "Aggregated Random Access Preamble assignment" message).

Figure 9:
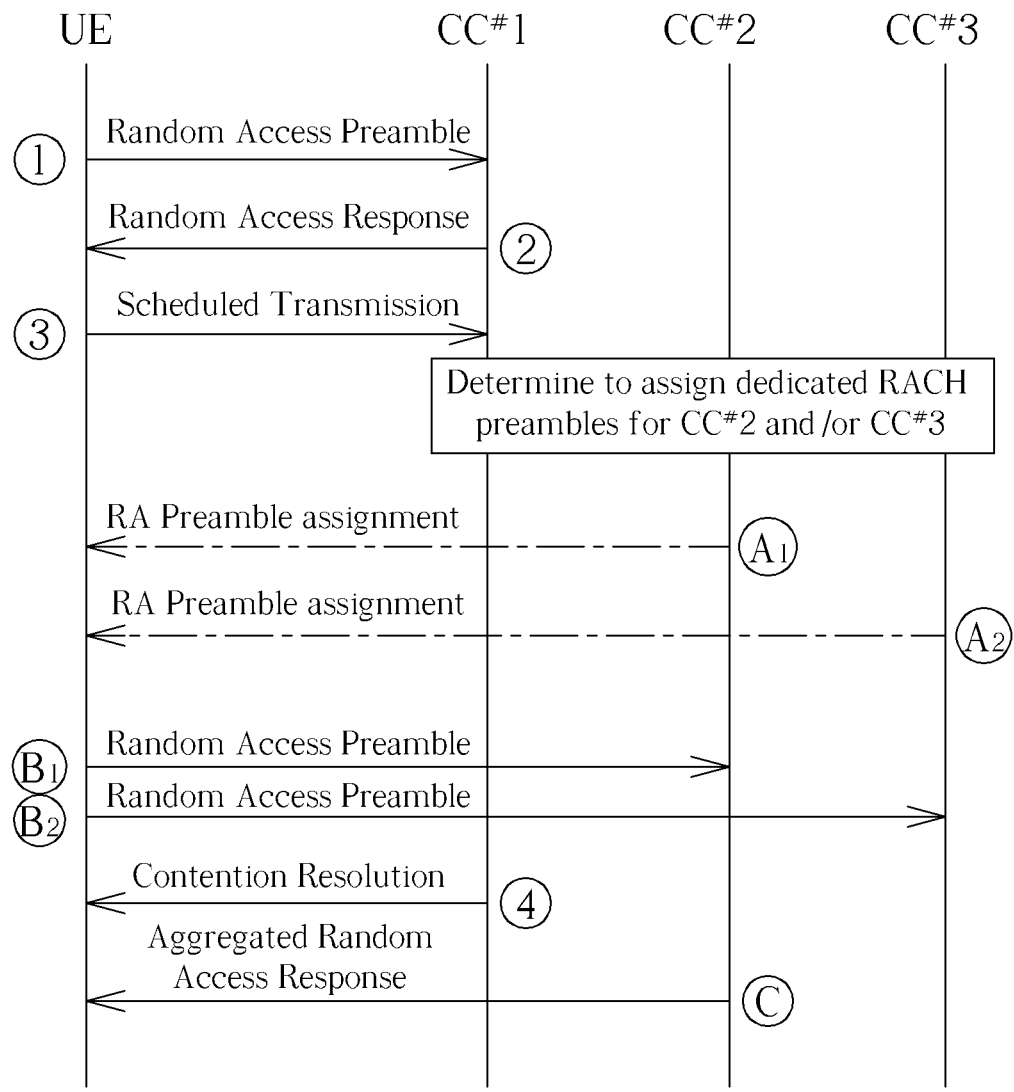

For the fifth example, please refer to FIG. 9. A transmission order between the random access procedures is not limited. More specifically, before a first random access procedure is completely performed, a second random access procedure may be initiated. In other words, each random access procedure is separately performed. In FIG. 9, the non-contention based random access procedure for cc#2 and cc#3 is initiated before the contention-based random access procedure for cc#1 is completely performed. In addition, the contention resolution message 4 is transmitted after the random access preamble B1 and/or B2 is transmitted to the component carrier cc#2 and/or cc#3. Besides, the non-contention based random access procedure for the cc#2 can be performed after the non-contention based random access procedure for the cc#3. For instance, the RA preamble assignment message $A_z$ may be prior to the RA preamble assignment message Ai. For those skilled in the art can make a modification for transmission order accordingly, and is not limited herein.

The process 40 clearly specifies how to combine the contention-based and non-contention based random access procedure to achieve uplink synchronization on multiple component carriers.

Figure 10:
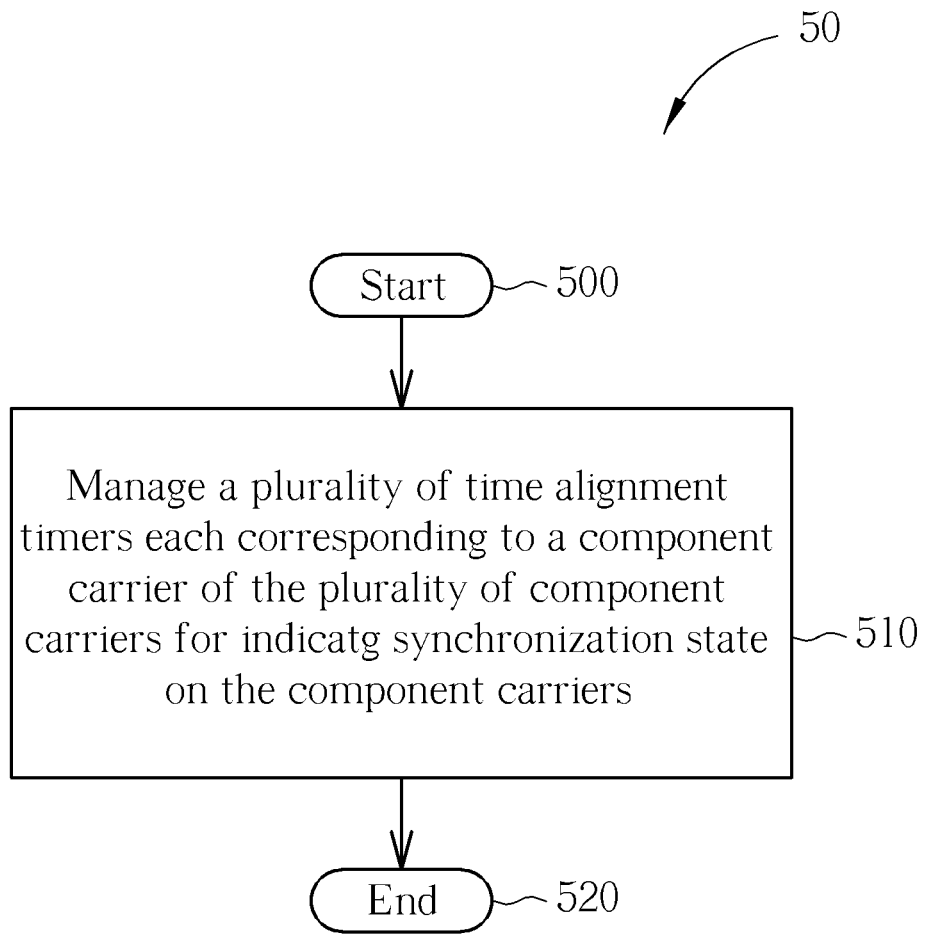
FIG. 10-12 are flowcharts of exemplary processes.

Please refer to FIG. 10, which illustrates a flowchart of an exemplary process 50. The process 50 is utilized in a UE capable of communicating with a network through a plurality of component carriers for handling uplink synchronization. The process 50 can be compiled into the program code 214 and includes the following steps:

Step 500: Start.

Step 510: Manage a plurality of time alignment timers each corresponding to a component carrier of the plurality of component carriers for indicating synchronization state on the component carrier.

Step 520: End.

According to the process 50, the UE manages the plurality of time alignment timers for indicate UE synchronization state on the plurality of component carriers. In other words, each of the plurality of component carriers is configured an independent time alignment timer. Functionality of the time alignment timer shall be well known in the art, so it is not given herein.

Take an example based on the process 50. Referring back to FIG. 1, the UE manages a first time alignment timer for component carrier cc#1, and a second alignment timer for component carrier cc#2, and so on. For time alignment timer management, when a timing advance command (TAC) in a MAC control element is received from the component carrier cc#1, the UE shall apply the TAC unconditionally, and starts or restarts the first timer alignment timer. On the other hand, when the TAC in a random access response message of a random access procedure is received from the component carrier cc#1, the UE determines whether a random access preamble of the random access procedure is explicitly signaled by the network. That is to say, the UE determines whether the random access procedure is contention-based or non-contention based. If the random access procedure is non-contention based, the UE directly applies the TAC carried in the random access response message, and starts or restarts the first time alignment timer. Conversely, if the random access procedure is contention-based, only when the time alignment timer is not running or has expired, i.e., uplink timing of the UE is not synchronized, the UE applies the TAC carried in the random access response message, and starts or restarts the first time alignment timer. Besides, if the first time alignment timer is running, which implies previous timing advance is still valid, the UE then ignores the received TAC.

Please note that, the abovementioned operation can be applied to any of the plurality component carriers (e.g. the component carrier cc#1-cc#m), so the detailed description is omitted herein. As can be seen, the process 50 clearly defines how the UE maintains time alignment timer functionality for the plurality of component carriers, so as to achieve uplink synchronization on multiple component carriers.

Figure 11:
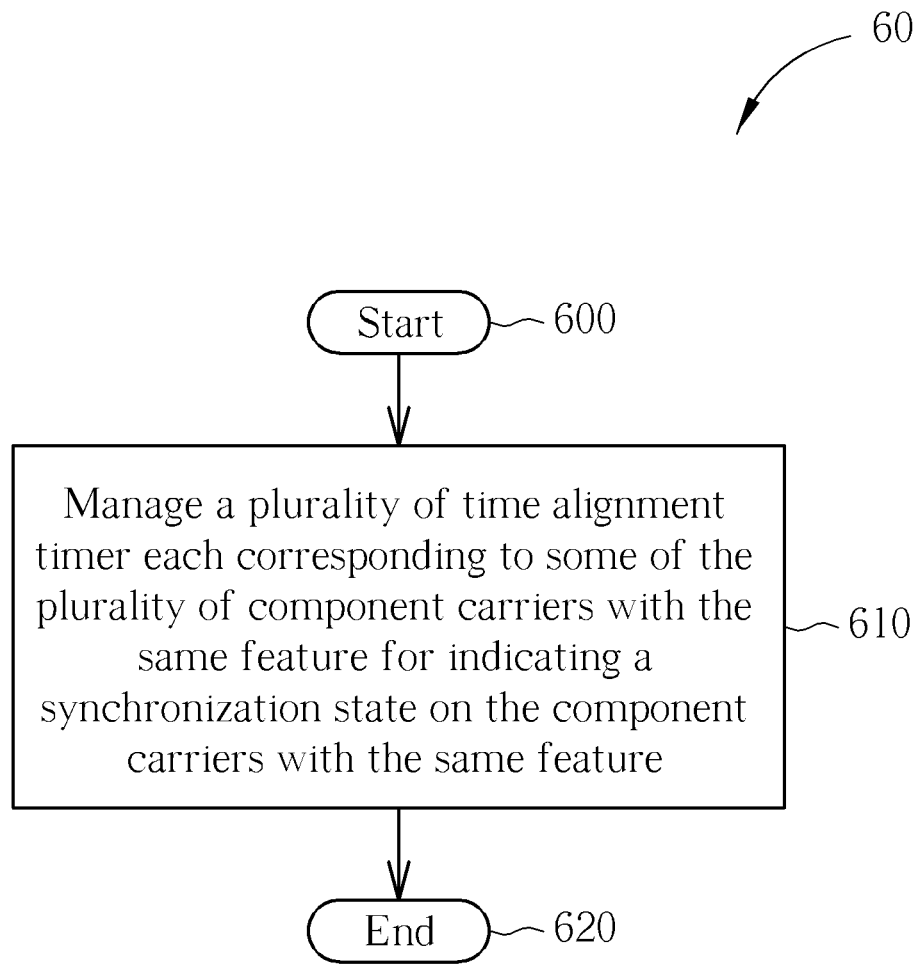

Please refer to FIG. 11, which illustrates a flowchart of an exemplary process 60. The process 60 is utilized in a UE capable of communicating with a network through a plurality of component carriers for handling uplink synchronization. The process 60 can be compiled into the program code 214 and includes the following steps:

Step 600: Start.

Step 610: Manage a plurality of time alignment timers each corresponding to some of the plurality of component carriers with the same feature for indicating synchronization state on the component carriers with the same feature.

Step 620: End.

According to the process 60, the UE manages the plurality of time alignment timers each for indicating UE synchronization state on a group of component carriers with the same feature. In other words, a group of component carriers with the same feature are configured a common time alignment timer. Please note that, the feature may be a timing advance value, propagation delay or a group identity. For example, component carriers within a source station (e.g. eNB, repeater, a remote radio head (RRH), etc.) may have the same feature. In some embodiments, component carriers corresponding to a RF architecture (e.g. a RF chain, RF module, etc.) may have the same feature. Therefore, the process 50 clearly defines how the UE maintain a functionality of the time alignment timer for the plurality of component carriers, so as to achieve uplink synchronization on multiple component carriers.

In addition, a base station (or an eNB) may notify the UE of component carrier group information via a control message, e.g. a RRC message when at lease one of the following events happens:

A. an uplink component carrier is added or removed;
B. an uplink component carrier is activated or deactivated;
C. the UE performs capability negotiation;
D. members of the component carrier group changes;
E. the UE configuration changes;
F. the eNB configuration changes;

Therefore, the UE can maintain the component carrier group according to the group information.

Take an example based on the process 60. Referring back to FIG. 1, the UE manages a first time alignment timer for component carrier cc#1 and a second alignment timer for component carriers cc#2-cc#4 since the component carriers cc#2-cc#4 belong to the same base station and thereby have the same timing advance value. For time alignment timer management, the UE starts or restarts the first time alignment timer when a TAC in a MAC control element is received from the component carrier cc#1, whereas the UE starts or restarts the second time alignment timer when the TAC in the MAC control element is received from one of the component carriers cc#2-cc#4. Or the UE starts or restarts the second time alignment timer when the TAC in the MAC control element is received from the component carrier cc#1, wherein the MAC control element may include an indication indicating that the TAC is for the component carriers cc#2-cc#4.

On the other hand, when the TAC in a random access response message of a random access procedure is received from the component carrier cc#1, the UE determines whether a random access preamble of the random access procedure is explicitly signaled by the network. The UE determines whether the random access procedure is contention-based or non-contention based. If the random access procedure is non-contention based, the UE directly applies the TAC carried in the random access response message, and starts or restarts the first time alignment timer. Conversely, if the random access procedure is contention-based, only when the time alignment timer is not running or has expired, the UE applies the TAC carried in the random access response message, and starts or restarts the first time alignment timer. If the first time alignment timer is running, which implies previous timing advance is still valid, the UE then ignores the received TAC.

Please note that, for a group of component carriers that have the same timing advance value, the UE performs a random access procedure only on one of the component carriers in the group, to obtain the timing advance value for the group of component carriers. Therefore, when the TAC in a random access response message of a random access procedure performed on one of the component carriers cc#2-cc#4 is received, the UE determines whether a random access preamble of the random access procedure is explicitly signaled by the network. If the random access procedure is non-contention based, the UE directly applies the TAC carried in the random access response message, and starts or restarts the second time alignment timer. Conversely, if the random access procedure is contention-based, only when the second time alignment timer is not running or has expired, the UE applies the TAC carried in the random access response message, and starts or restarts the second time alignment timer. If the second time alignment timer is running, which implies previous timing advance is still valid, the UE then ignores the received TAC.

Figure 12:
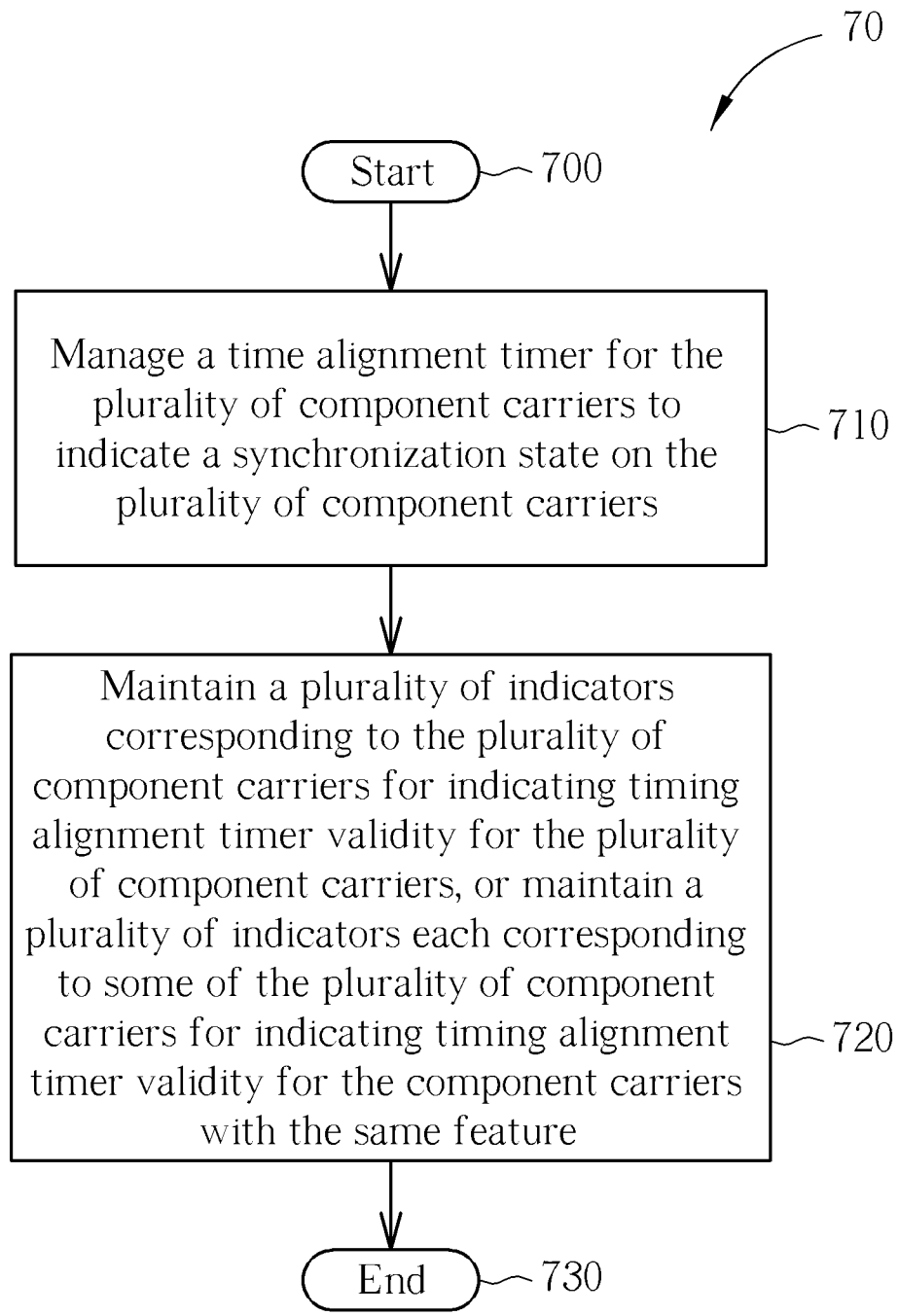

Please refer to FIG. 12, which illustrates a flowchart of an exemplary process 70. The process 70 is utilized in a UE, as the mobile device 10 of FIG. 1, capable of communicating with a network through a plurality of component carriers for handling uplink synchronization. The process 70 can be compiled into the program code 214 and includes the following steps:

Step 700: Start.

Step 710: Manage a time alignment timer for the plurality of component carriers to indicate a synchronization state on the plurality of component carriers.

Step 720: Maintain a plurality of indicators corresponding to the plurality of component carriers for indicating timing alignment timer validity for the plurality of component carriers, or maintain a plurality of indicators each corresponding to some of the plurality of component carriers for indicating timing alignment timer validity for the component carriers with the same feature.

Step 730: End.

According to the process 70, the UE manages one single timing alignment timer for the plurality of component carriers. In addition, the UE maintains a plurality of indicators each used for indicating whether the timing alignment timer is valid for a component carrier or for a group of component carriers with the same feature. In other words, the UE manages the timing alignment timer with the plurality of indicators each corresponding to a component carrier of the plurality of component carriers or to a group of component carriers, for indicating UE synchronization state on each component carrier or on the group of component carriers with the same feature.

Figure 13:
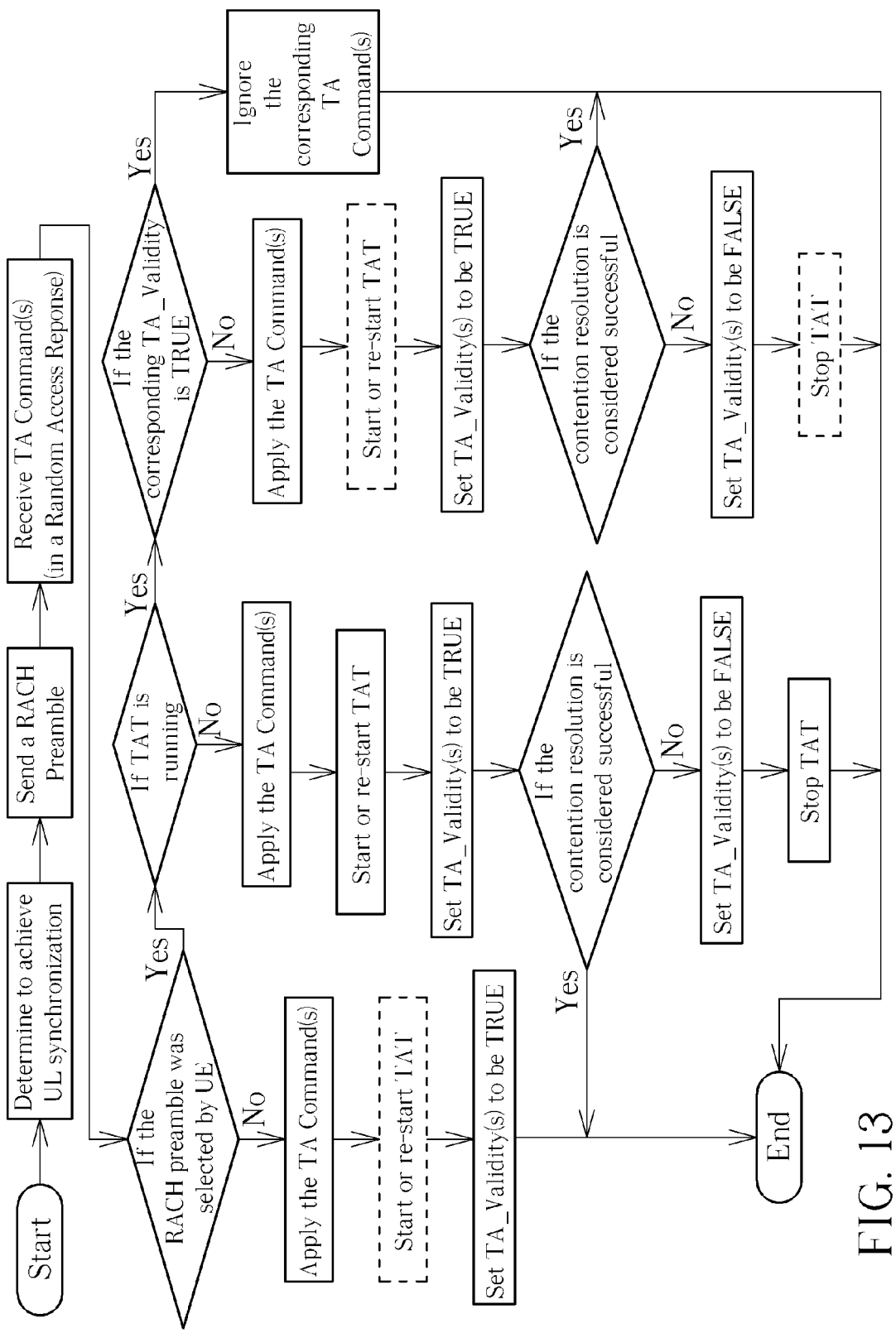
FIG. 13-15 are flowcharts for an operation of the timing alignment timer management according to different embodiments.

Take an example based on the process 70. Referring back to FIG. 1, the UE manages one single timing alignment timer for the component carriers cc#1-cc#m, and maintains a plurality of indicators corresponding to the plurality of component carriers cc#1-cc#m. In addition, please refer to FIG. 13, which is a flowchart for an operation of the timing alignment timer management according to a first embodiment. The UE firstly determines to achieve uplink synchronization. The detailed description for uplink synchronization establishment can be referred to the process 40, so it is not given herein. Assume that the UE decides to establish uplink synchronization on the component carrier cc#1, and initiates a random access procedure on the component carrier cc#1. During the random access procedure, the UE sends a random access preamble and then receives a TAC in a random access response message of the random access procedure. After receiving the TAC, the UE determines whether the random access preamble is selected by itself. Namely, the UE determines whether the random access procedure is contention-based or not. If the random access preamble is not selected by itself, the UE applies the TAC, and starts or restarts the timing alignment timer. After that, the UE sets the indicator corresponding to the first component carrier cc#1 to a first value, which indicates that the timing alignment timer is valid for the component carrier cc#1. Note that, the indicator may be a bit (hereafter called TA_Validity), and is set to "True" when the timing alignment timer is valid for the corresponding component carrier, whereas set to "False" when the timing alignment timer is invalid for the corresponding component carrier.

On the other hand, if the random access preamble is selected by itself (namely the random access procedure is contention-based), the UE determines whether the timing alignment timer is running. If the timing alignment timer is not running, the UE applies the TAC, and starts or restarts the timing alignment timer. Moreover, the UE sets the TA_Validity corresponding to the component carrier cc#1 to "True". Continuously, the UE performs contention resolution of the random access procedure, and determines whether the contention resolution is successful. If the UE considers that the contention resolution of the random access procedure is not successful, the UE sets the TA_Validity corresponding to the component carrier cc#1 to "False", and stops the timing alignment timer.

Conversely, if the timing alignment timer is still running, the UE determines whether the TA_Validity corresponding to the component carrier cc#1 is set to "True". If the TA_Validity is not set to "True", the UE applies the TAC, and starts or restarts the timing alignment timer. Moreover, the UE sets the TA_Validity corresponding to the component carrier cc#1 to "True". Continuously, the UE performs contention resolution of the random access procedure, and determines whether the contention resolution is successful. If UE considers that the contention resolution of the random access procedure is not successful, sets the TA_Validity to "False", and stops the timing alignment timer. On the other hand, if the TA_Validity is set to "True", the UE ignores the received TAC.

Please note that, the abovementioned operation can be applied to any of the plurality of component carriers (e.g. the component carrier cc#2-cc#m). In addition, for a group of component carriers, UE performs a random access procedure only on one of the component carriers. Thus, the UE maintains an indicator for a group of component carriers for indicating whether the timing alignment timer is valid for the group of component carriers based on the abovementioned description. The detailed description can be referred from above, so it is not given herein.

Figure 14:
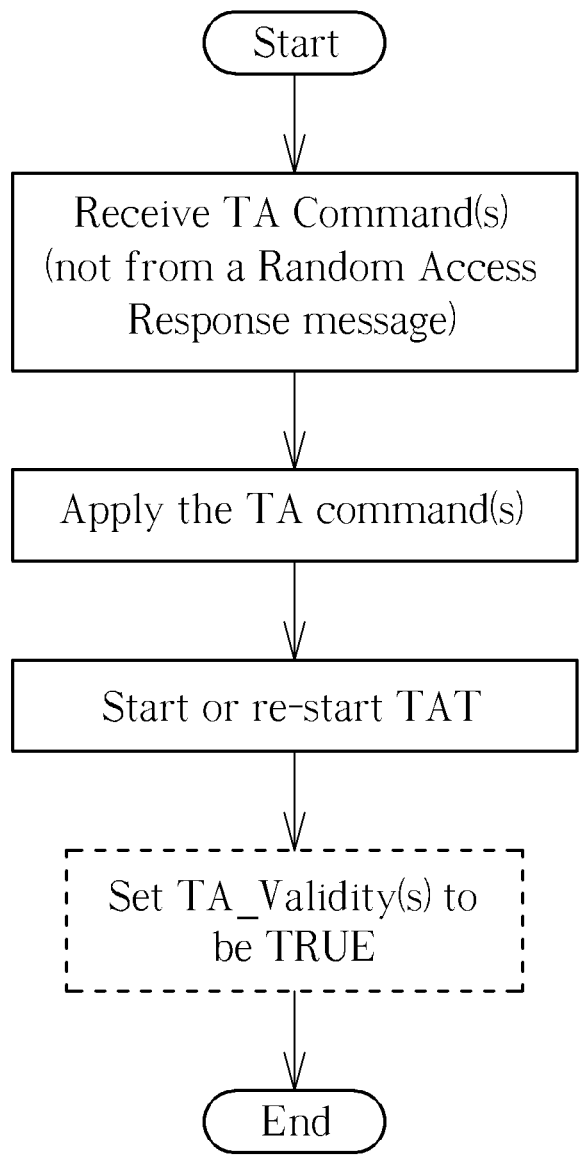
Figure 15:
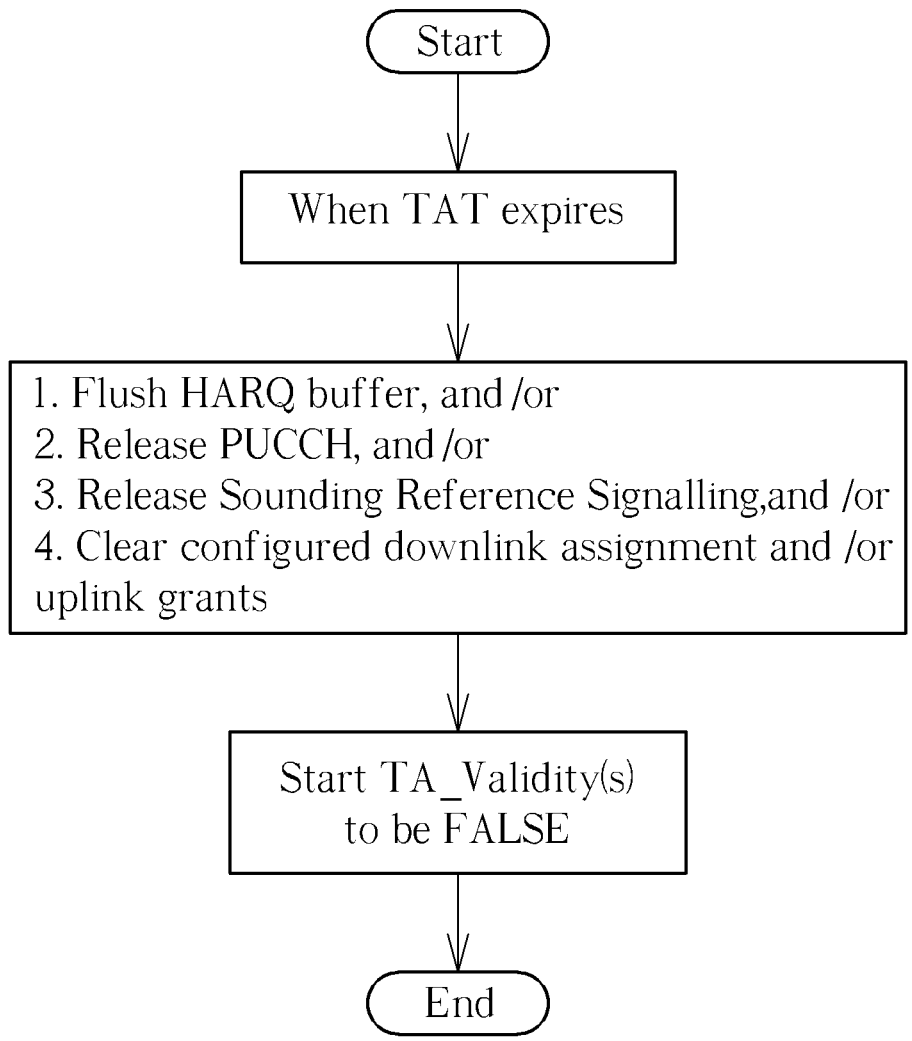

Besides, when the UE does not receive a TAC in the random access response but in a MAC control element, the UE manages the timing alignment timer based on the process in FIG. 14. The UE directly applies the TAC, and starts or restarts the timing alignment timer when the TAC in the MAC control element is received in any of the plurality of component carriers (i.e. the component carrier cc#1), and sets TA_Validity corresponding to the component carrier cc#1 to "True. Furthermore, upon expiry of the timing alignment timer, the UE behaves as shown in FIG. 15. As can be seen, the UE performs at lease one of steps: HARQ buffet flush, PUCCH release, Sounding Reference Signalling release, configured downlink assignment clearing, and uplink grant clearing when the timing alignment timer is expired. After that, the UE sets all the TA_Validity to "False".

Figure 16:
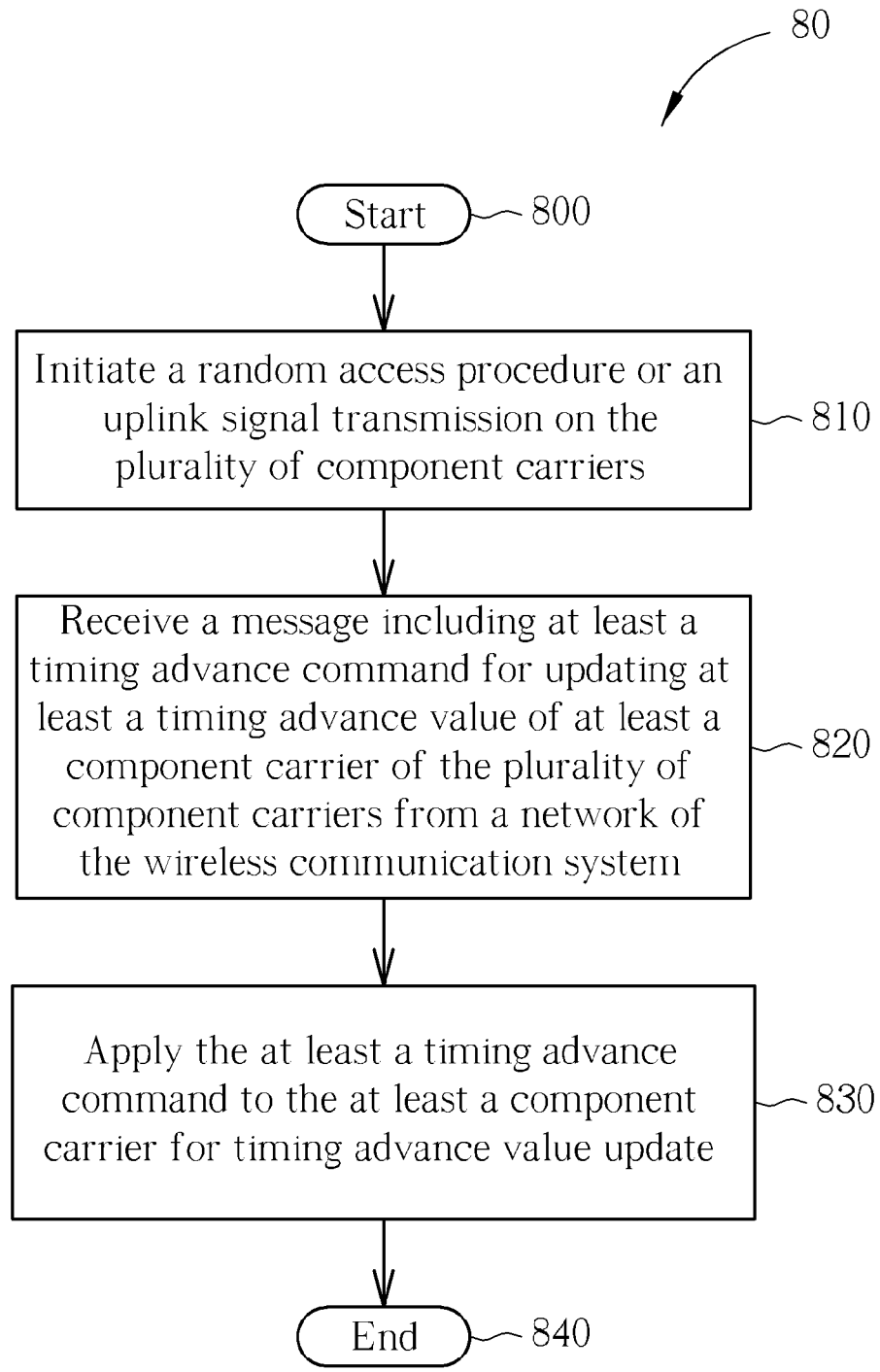
FIG. 16 is a flowchart of exemplary processes.

Please refer to FIG. 16, which illustrates a flowchart of an exemplary process 80. The process 80 is utilized in a UE capable of communicating with a network through a plurality of component carriers for handling uplink synchronization. The process 80 can be compiled into the program code 214 and includes the following steps:

Step 800: Start.

Step 810: Initiate a random access procedure or an uplink signal transmission on the plurality of component carriers.

Step 820: Receive a message including at least a timing advance command for updating at least a timing advance of at least a component carrier of the plurality of component carriers from the network.

Step 830: Apply the at least a timing advance command to the at least a component carrier for timing advance value update.

Step 840: End.

According to the process 80, when the message including the timing advance commands corresponding to component carriers is received on one of the plurality component carriers, the UE applies the timing advance commands to the corresponding component carriers for updating timing advance values of the component carriers. Therefore, the UE can perform timing advance update on multiple component carriers based on one message, so as to reduce signaling amount.

Figure 17:
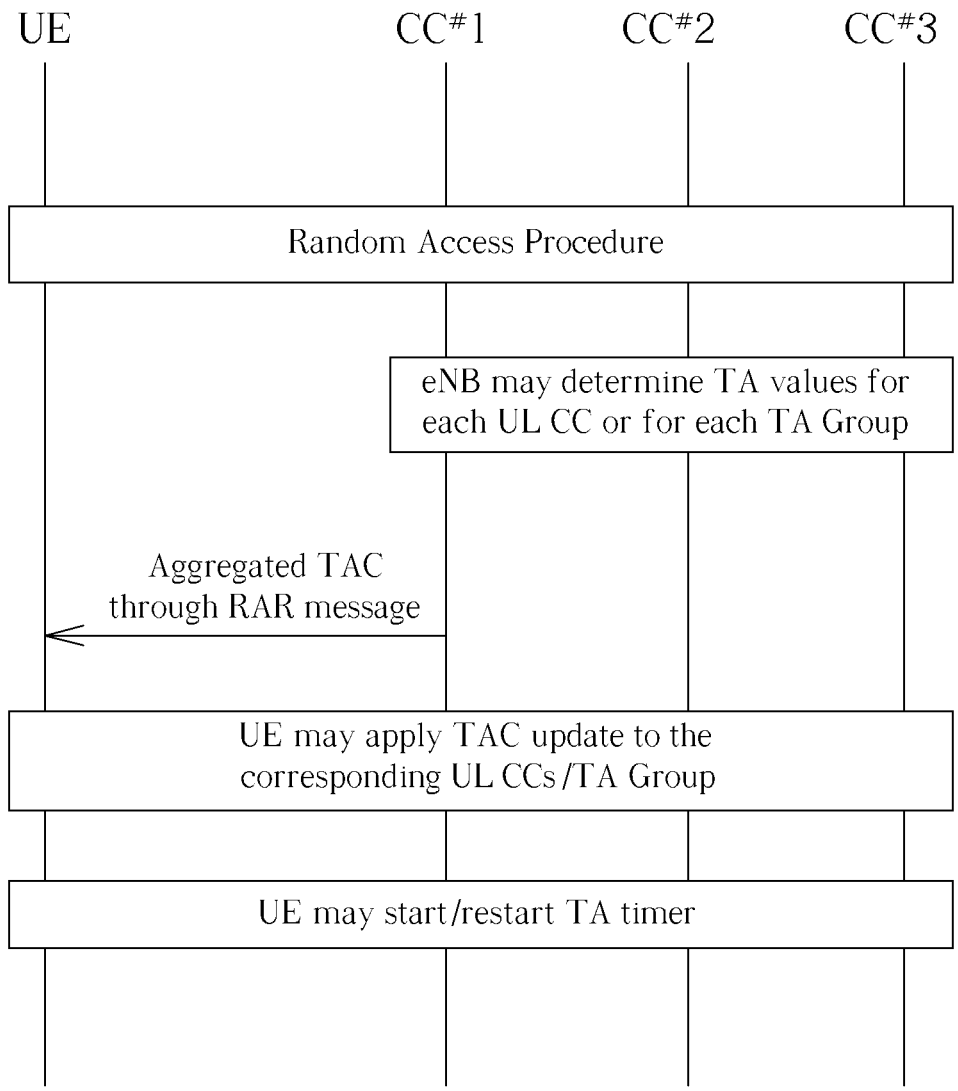
FIG. 17 is a transmission sequence diagram of a communication device.

Take an example based on the process 80. Please refer to FIG. 17. The UE performs a random access procedure on the component carriers cc#1-cc#3. The network (i.e. an eNB) determines timing advance values for each of the component carriers cc#1-cc#3 or for each group (e.g. a first group including the component carrier cc#1 and a second group including the component carriers cc#2-cc#3). The network utilizes a random access response message of the random access procedure to inform UE about timing advance values for the component carriers cc#1-cc#3. In addition, the random access response includes timing advance commands for the component carriers cc#1-cc#3. Therefore, after the UE receives the random access response, the UE applies the timing advance commands to the component carriers cc#1-cc#3, and starts or restarts the timing alignment timer. As to the management of the timing alignment timer, please refer to above, it is omitted herein.

Figure 18A:
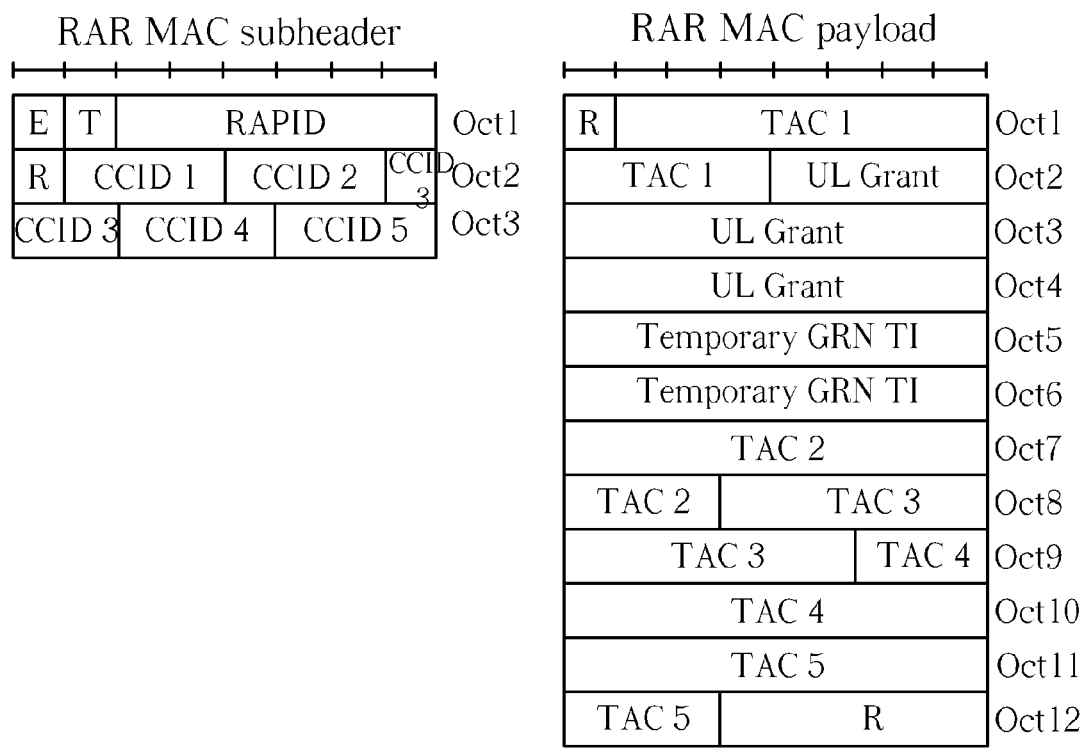
FIG. 18A-18C illustrate schematic diagrams of formats of a random access response message.
Figure 18B:
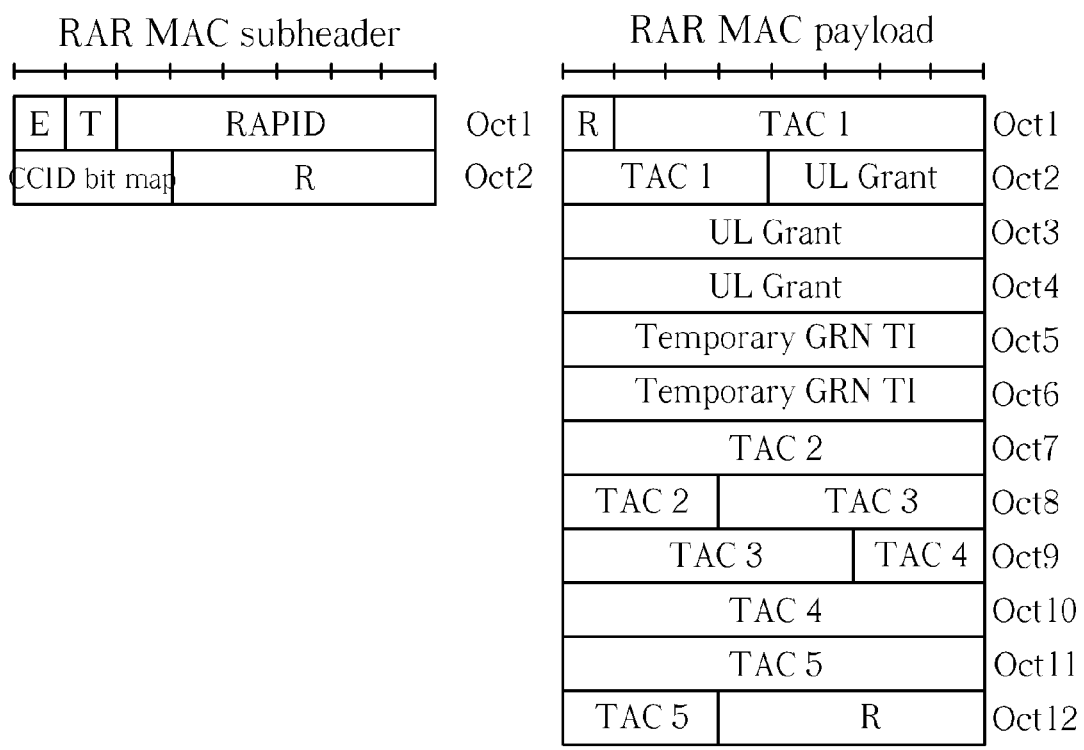
Figure 18C:
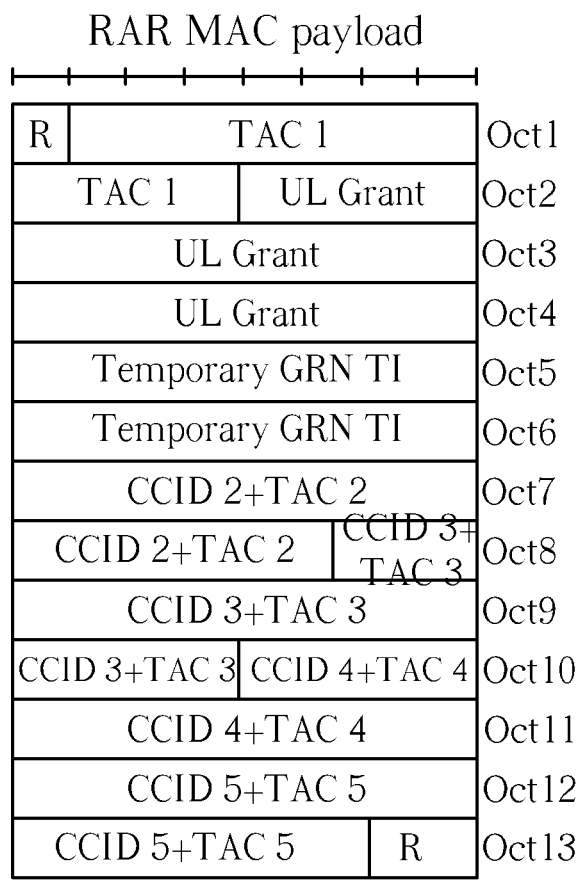

Please refer to FIG. 18, which illustrates a format of the aggregated random access response message. The random access response message may include at least a MAC subheader and a MAC payload. In addition, the MAC subheader may include bitmap information and/or identity information of the component carriers that are determined to be updated (as shown in FIG. 18A-18B), or the MAC payload may include bitmap information and/or identity information of the component carriers that are determined to be updated (as shown in FIG. 18C). Note that, the abovementioned identity information may be a component carrier identity or a component carrier group identity. The definition of the component carrier group can be referred from above, so it is not given herein.

Figure 19:
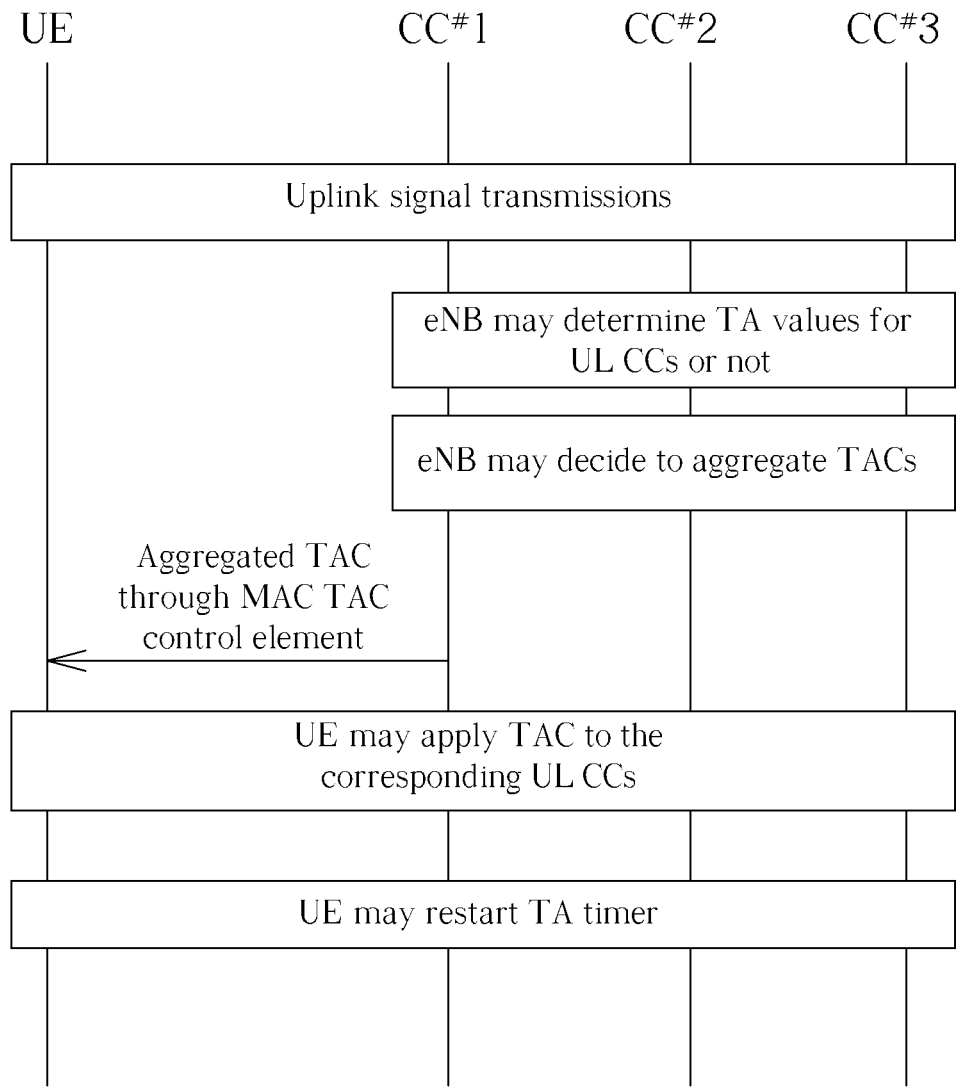
FIG. 19 is a transmission sequence diagram of a communication device.
Figure 20:
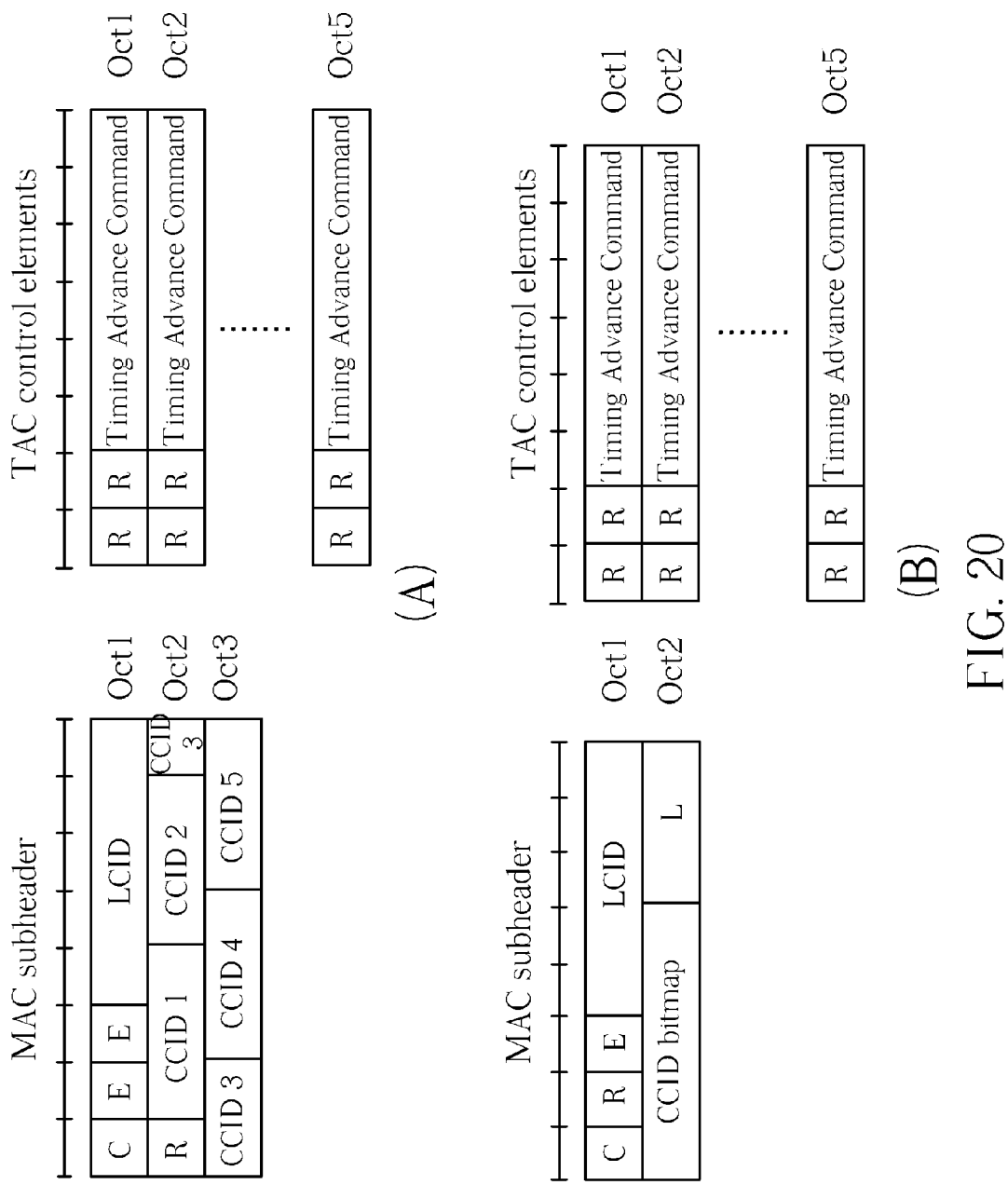
FIG. 20 illustrates a schematic diagram of a formats of a MAC control element.
Figure 23:
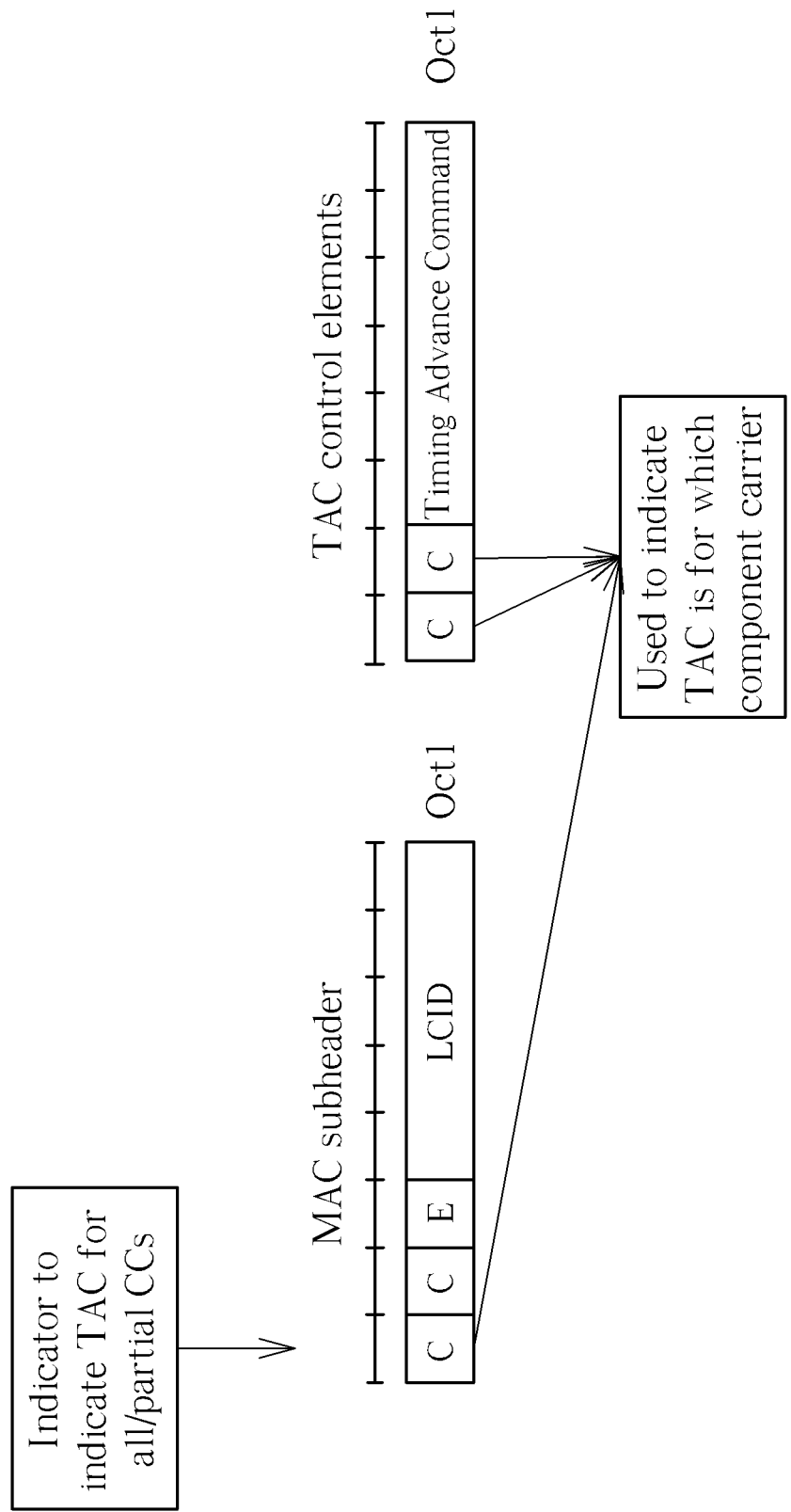
FIG. 23 illustrates a schematic diagram of an exemplary format of a MAC control element.

Instead of random access response message, the network may utilize a MAC control element to update the timing advance values for the component carriers cc#1-cc#3. Please refer to FIG. 19. As can be seen, the UE performs uplink signal transmission on the component carriers cc#1-cc#3, so that the network can determine TA value by measuring the uplink signal. The network aggregates the timing advance commands in the MAC control element. The detailed description can be referred from above, so it is not given herein. In addition, please refer to FIG. 20 for a format of the MAC control element. The MAC control element includes at least a MAC subheader and at least a timing advance command control element. In addition, the MAC subheader may include bitmap information and/or identity information of the component carriers (as shown in FIGS. 20(A)-20(B)). On the other hand, the timing advance command control element may include the bitmap information and/or identity information of the component carriers. Furthermore, the MAC subheader and/or the timing advance command control element may include a first indicator to indicate that the received timing advance command(s) is applied for all or partial component carriers, and/or may include a second indicator to indicate the received timing advance command(s) is applied for which component carrier. Please refer to FIG. 23, which illustrates an exemplary format of the MAC control element. The MAC subheader includes a one bit indicator. In an embodiment, the received timing advance command is applied for all component carriers if it is set to "0", whereas applied for partial component carriers if it is set to "1". In addition, the MAC subheader may include another one bit indicator, and the timing advance command control element includes a two bits indicator. In some embodiment, the received timing advance command is applied for component carrier cc#1 if the three bits are set to "001", for component carrier cc#2 if set to "010", and for component carrier cc#3 if set to "011".

The process 80 clearly specifies how to aggregate timing advance command transmissions into a single message (e.g. the random access response message or MAC control element), so as to decrease signaling amount.

Figure 21:
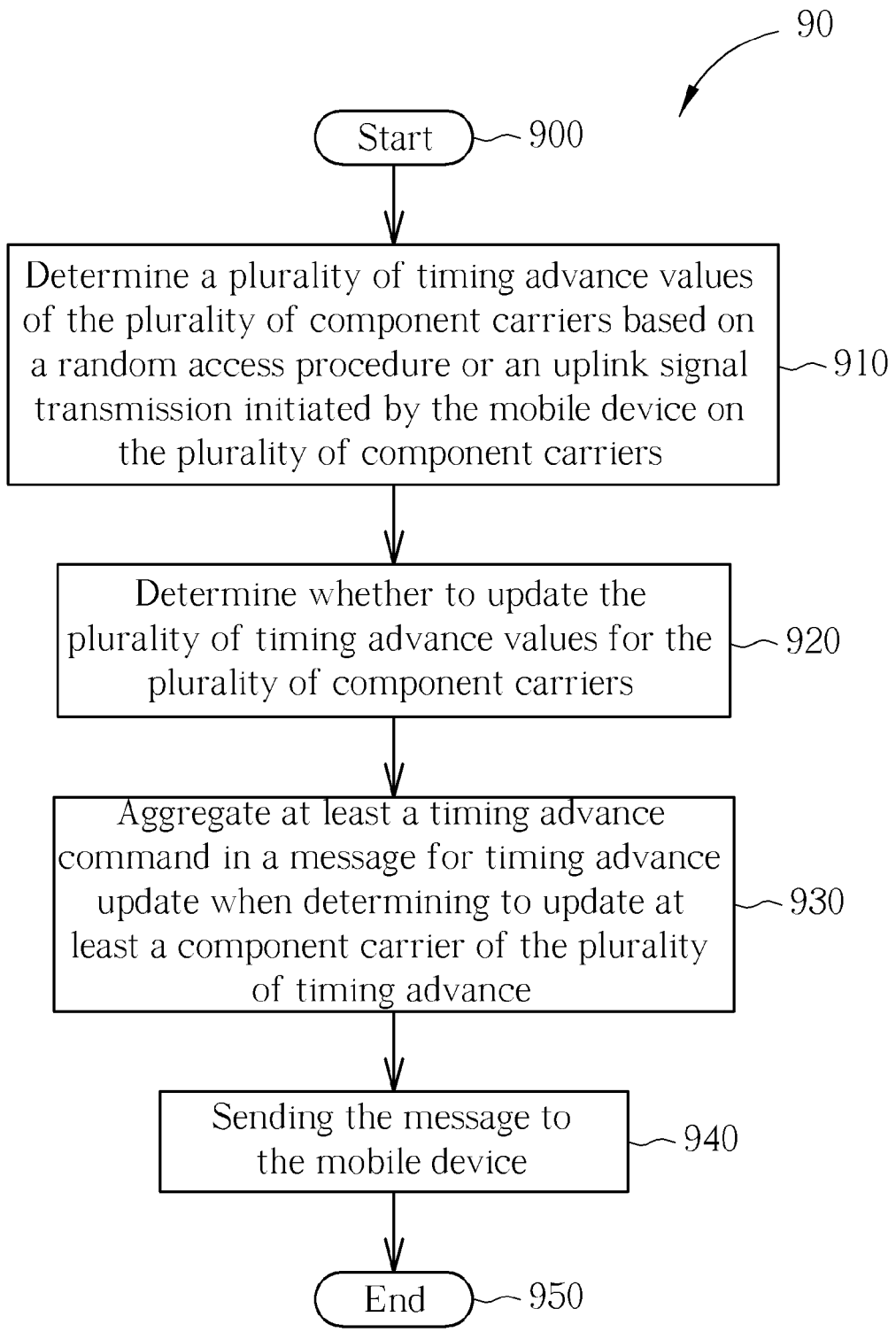
FIG. 21 is a flowchart of exemplary processes.

Continuously, please refer to FIG. 21, which illustrates a flowchart of an exemplary process 90. The process 90 is utilized in a network for handling uplink synchronization. The process 90 can be compiled into the program code 214 and includes the following steps:

Step 900: Start.

Step 910: Determine a plurality of timing advance values of the plurality of component carriers based on a random access procedure or an uplink signal transmission initiated by the mobile device on the plurality of component carriers.

Step 920: Determine whether to update the plurality of timing advance values for the plurality of component carriers.

Step 930: Aggregate at least a timing advance command in a message for timing advance update when determining to update at least a component carrier of the plurality of timing advance.

Step 940: Send the message to the mobile device.

Step 950: End.

According to the process 90, the network determines timing advance values by measuring random access transmission (e.g. a random access preamble) or an uplink signal transmission. After that, the network determines whether to update the timing advance values for the corresponding component carriers. If the network determines to update the timing advance values, the network aggregates timing advance command(s) in a random access response message or MAC control element, and sends the aggregated random access response message or MAC control element to UE, so that the UE can update timing advance values according to the timing advance command(s) in the aggregated random access response message or MAC control element.

In conclusion, the present invention provides methods and apparatus in uplink timing alignment, timing alignment timer management, and timing advance update on multiple component carriers, so as to achieve uplink synchronization on multiple component carriers Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling uplink synchronization for a mobile device capable of receiving and transmitting on a plurality of component carriers in a wireless communication system, the method comprising:
   performing a first random access procedure on a first component carrier of the plurality of component carriers to establish uplink synchronization on the first component carrier; and
   performing a second random access procedure on at least a component carrier of the plurality of component carriers to establish uplink synchronization on the at least a component carrier, which comprises:
       receiving at least a random access preamble assigned by a network of the wireless communication system for the at least a component carrier;
       sending at least a random access preamble message including the at least a random access preamble to the network; and
       receiving a random access response message on the first component carrier corresponding to the at least a random access preamble message from the network, wherein the random access response message includes at least a timing advance value determined by the network according to the at least a random access preamble message.

2. The method of claim 1, wherein receiving the at least a random access preamble for the at least a component carrier from the network of the wireless communication system comprises:
   receiving the at least a random access preamble in a contention resolution message of the first random access procedure from the network through at least a component carrier; or
   receiving the at least a random access preamble in at least a first message dedicated for random access preamble assignment from the network through the at least a component carrier; or
   receiving a second message aggregated with the at least a first message from the network through one of the plurality of component carriers.

3. The method of claim 1, wherein receiving the at least a random access response message corresponding to the at least a random access preamble message from the network comprises:
   receiving a third message aggregated with the at least a random access response message from the network through one of the plurality of component carriers.

4. The method of claim 1, wherein performing the second random access procedure on the at least a component carrier of the plurality of component carriers to establish uplink synchronization on the at least a component carrier comprises:
   receiving one random access preamble assigned by a network of the wireless communication system for one of the at least a component carrier;
   sending a random access preamble message including the random access preamble to the network; and
   receiving at least a random access response message corresponding to the random access preamble message from the network, wherein the at least a random access response message includes at least a timing advance determined by the network according to the random access preamble message.

5. The method of claim 4, wherein receiving one random access preamble for one of the at least a component carrier from the network of the wireless communication system comprises:
   receiving the one random access preamble in a contention resolution message of the first random access procedure from the network through one of the plurality of component carriers; or
   receiving the one random access preamble in a first message dedicated for random access preamble assignment from the network through one of the at least a component carrier.

6. The method of claim 4, wherein receiving the at least a random access response message corresponding to the random access preamble message from the network comprises:
   receiving a second message aggregated with the at least a random access response message from the network through one of the plurality of component carriers.

7. The method of claim 1, wherein performing the first random access procedure on the first component carrier of the plurality of component carriers to establish uplink synchronization on the first component carrier comprises:
   receiving no contention resolution message of the first random access procedure; and
   determining the first random access procedure is successful performed when a random access preamble of the second random access procedure is received.

8. The method of claim 1, wherein performing a second random access procedure on the at least a component carrier of the plurality of component carriers to establish uplink synchronization on the at least a component carrier comprises:
   performing the second random access procedure on the at least a component carrier before the first random access procedure is completely performed.

9. A mobile device of a wireless communication system for handling uplink synchronization, the mobile device capable of receiving and transmitting on a plurality of component carriers, the mobile device comprising:
   a processor for executing a program; and
   a storage unit coupled to the processor for storing the program; wherein the program instructs the processor to perform the following steps:
       performing a first random access procedure on a first component carrier of the plurality of component carriers to establish uplink synchronization on the first component carrier; and performing a second random access procedure on at least a component carrier of the plurality of component carriers to establish uplink synchronization on the at least a component carrier, which comprises:
- receiving at least a random access preamble assigned by a network of the wireless communication system for the at least a component carrier;
- sending at least a random access preamble message including the at least a random access preamble to the network; and
- receiving a random access response message on the first component carrier corresponding to the at least a random access preamble message from the network, wherein the random access response message includes at least a timing advance value determined by the network according to the at least a random access preamble message.

10. A method of handling uplink synchronization for a mobile device capable of receiving and transmitting on a plurality of component carriers in a wireless communication system, the method comprising:
- performing a random access procedure on a first component carrier of component carriers with the same timing advance value to obtain a timing advance value; and
- managing a plurality of time alignment timers each corresponding to some of the plurality of component carriers for indicating a synchronization state on the component carriers with the same timing advance value, wherein the managing step comprises:
  - starting or restarting the time alignment timer when a timing advance command in a random access response message of the random access procedure is received for the first component carrier, and a random access preamble of the random access procedure is not selected by the mobile device or the time alignment timer is not running.

11. The method of claim 10, wherein managing the plurality of time alignment timers each corresponding to the component carrier of the plurality of component carriers for indicating the synchronization state on the component carrier comprises:
- starting or restarting a first time alignment timer of the plurality of time alignment timers when a timing advance command in a medium access control (MAC) control element is received from the corresponding component carrier of the plurality of component carriers; or
- starting or restarting the first time alignment timer when the timing advance command in a random access response message of a random access procedure is received from the corresponding component carrier, and a random access preamble of the random access procedure is not selected by the mobile device or the first time alignment timer is not running.

12. A mobile device of a wireless communication system for handling uplink synchronization, the mobile device capable of receiving and transmitting on a plurality of component carriers, the mobile device comprising:
- a processor for executing a program; and
- a storage unit coupled to the processor for storing the program; wherein the program instructs the processor to perform the following steps:
- performing a random access procedure on a first component carrier of component carriers with the same timing advance value to obtain the timing advance value; and
- managing a plurality of time alignment timers each corresponding to some of the plurality of component carriers for indicating a synchronization state on the component carriers with the same timing advance value, wherein the managing step comprises:
  - starting or restarting the time alignment timer when a timing advance command in a random access response message of the random access procedure is received for the first component carrier, and a random access preamble of the random access procedure is not selected by the mobile device or the time alignment timer is not running.

* * * * *